United States Patent
Gelmetti et al.

(10) Patent No.: US 10,010,962 B1
(45) Date of Patent: Jul. 3, 2018

(54) MODULE AND SYSTEM FOR CONTROLLING AND RECORDING WELDING DATA, AND WELDING WIRE FEEDER

(71) Applicant: AWDS TECHNOLOGIES SRL, Rovereto (TN) (IT)

(72) Inventors: Carlo Gelmetti, Lazise (IT); Filippo Corradini, Isera (IT); Fabio Perazzoli, Lazise (IT)

(73) Assignee: AWDS TECHNOLOGIES SRL (IT)

( * ) Notice: Subject to any disclaimer, the term of this patent is extended or adjusted under 35 U.S.C. 154(b) by 77 days.

(21) Appl. No.: 14/481,722

(22) Filed: Sep. 9, 2014

(51) Int. Cl.
*B23K 9/10* (2006.01)
*B23K 33/00* (2006.01)
*B23K 9/12* (2006.01)
*B23K 9/133* (2006.01)
*B23K 9/095* (2006.01)

(52) U.S. Cl.
CPC .............. *B23K 9/124* (2013.01); *B23K 9/133* (2013.01); *B23K 9/095* (2013.01); *B23K 9/1336* (2013.01)

(58) Field of Classification Search
CPC .... B23K 9/133–9/1336; B23K 9/095–9/0956; B23K 9/124–9/125
USPC ............................................. 219/136–137.2
See application file for complete search history.

(56) References Cited

U.S. PATENT DOCUMENTS

| | | |
|---|---|---|
| 318,062 A | 5/1885 | Warren |
| 532,565 A | 1/1895 | Kilmer |
| 617,353 A | 1/1899 | Redmond |
| 627,722 A | 6/1899 | Edwards |
| 932,808 A | 8/1909 | Pelton |
| 1,276,117 A | 8/1918 | Riebe .............................. 464/171 |
| 1,468,994 A | 9/1923 | Cook ............................. 206/393 |
| 1,508,689 A | 9/1924 | Glasser .................... 219/124.03 |
| 1,640,368 A | 8/1927 | Obetz |
| 1,821,354 A | 9/1931 | Meyer ............................ 242/159 |
| 1,907,051 A | 5/1933 | Emery |
| 1,936,227 A | 11/1933 | Cook ................................ 206/59 |
| 2,027,670 A | 1/1936 | Broeren .......................... 312/62 |
| 2,027,674 A | 1/1936 | Broeren .......................... 312/60 |
| 2,059,462 A | 11/1936 | Jungmann |
| 2,078,161 A | 4/1937 | Rietsch ........................... 74/297 |
| 2,329,369 A | 9/1943 | Haver ............................. 285/11 |
| 2,366,101 A | 12/1944 | Grothey ..................... 66/125 R |

(Continued)

FOREIGN PATENT DOCUMENTS

| | | | |
|---|---|---|---|
| CN | 1466469 | 1/2004 | ............. A61L 15/60 |
| CN | 1626423 | 6/2005 | ............. B65H 75/16 |

(Continued)

OTHER PUBLICATIONS

"International Plastics Flammability Handbook" Jurgen Troitzsch, $2^{nd}$ edition, 1990, pp. 33, 43-49 and 59.

(Continued)

*Primary Examiner* — Sang Y Paik
(74) *Attorney, Agent, or Firm* — Hayes Soloway P.C.

(57) ABSTRACT

A module for controlling welding parameters and a method for operating a welding wire feeder is disclosed, with the feeder having a motor, a feeding wheel driven by the motor, a control which controls operation of the motor, an operator interface adapted for allowing an operator to input data which is being used by the control.

20 Claims, 24 Drawing Sheets

(56) References Cited

U.S. PATENT DOCUMENTS

| | | | |
|---|---|---|---|
| 2,407,746 A | 9/1946 | Johnson | |
| 2,457,910 A | 1/1949 | McLaren et al. | 74/501 |
| 2,477,059 A | 7/1949 | Hill | 242/137.1 |
| 2,483,760 A | 10/1949 | Duncan | 254/190 |
| 2,579,131 A | 12/1951 | Tinsley | 206/409 |
| 2,580,900 A | 1/1952 | Epstein | 206/409 |
| 2,679,571 A | 5/1954 | Chappel | 219/137.44 |
| 2,694,130 A | 11/1954 | Howard | 219/8 |
| 2,713,938 A | 7/1955 | Snyder | |
| 2,724,538 A | 11/1955 | Schweich | |
| 2,752,108 A | 6/1956 | Richardson | 242/128 |
| 2,838,922 A | 6/1958 | Gift | 66/125 R |
| 2,849,195 A | 8/1958 | Richardson | |
| 2,864,565 A | 12/1958 | Whearly | 242/128 |
| 2,869,719 A | 1/1959 | Hubbard | |
| 2,880,305 A | 3/1959 | Baird | |
| 2,911,166 A | 11/1959 | Haugwitz | 242/128 |
| 2,929,576 A | 3/1960 | Henning | |
| 2,966,258 A | 12/1960 | Krafft | |
| 2,974,850 A | 3/1961 | Mayer | |
| 2,984,596 A | 5/1961 | Franer | 206/412 |
| 3,022,415 A | 2/1962 | Francois | 219/137.44 |
| 3,096,951 A | 7/1963 | Jenson | 242/137.1 |
| 3,108,180 A | 10/1963 | Linnander | 219/137.44 |
| 3,119,042 A | 1/1964 | Bond | |
| 3,185,185 A | 5/1965 | Pfund | |
| 3,244,347 A | 4/1966 | Jenk | |
| 3,274,850 A | 9/1966 | Tascio | 74/501 |
| 3,283,121 A | 11/1966 | Bernard et al. | 219/137.44 |
| 3,284,608 A | 11/1966 | McDonald | 219/137.43 |
| 3,344,682 A | 10/1967 | Bratz | 74/501 |
| 3,352,412 A | 11/1967 | Draving et al. | 206/59 |
| 3,433,504 A | 3/1969 | Hanes | 285/93 |
| 3,463,416 A | 8/1969 | Quenot | 242/396.9 |
| 3,478,435 A | 11/1969 | Cook | |
| 3,491,876 A | 1/1970 | Zecchin | |
| 3,512,635 A | 5/1970 | Lang | |
| 3,536,888 A | 10/1970 | Borneman | 219/137.43 |
| 3,565,129 A | 2/1971 | Field | |
| 3,567,900 A | 3/1971 | Nelson | |
| 3,576,966 A | 5/1971 | Sullivan | |
| 3,586,222 A | 6/1971 | Rosen | 226/1 |
| 3,595,277 A | 7/1971 | Lefever | |
| 3,630,425 A * | 12/1971 | Wilkens | B23K 9/1336 226/108 |
| 3,648,920 A | 3/1972 | Stump | |
| 3,672,655 A * | 6/1972 | Carter | B65H 51/10 226/108 |
| 3,675,499 A | 7/1972 | Marosy | 24/573.11 |
| 3,690,567 A | 9/1972 | Borneman | 239/591 |
| 3,724,249 A | 4/1973 | Asbeck et al. | |
| 3,729,092 A | 4/1973 | Marcell | |
| 3,730,136 A | 5/1973 | Okada | 118/78 |
| 3,799,215 A | 3/1974 | Willems | |
| 3,815,842 A | 6/1974 | Scrogin | 242/423.1 |
| 3,823,894 A | 7/1974 | Frederick et al. | 242/137.1 |
| 3,939,978 A | 2/1976 | Thomaswick | 206/454 |
| 4,000,797 A | 1/1977 | Ducanis | 193/38 |
| 4,043,331 A | 8/1977 | Martin et al. | 128/156 |
| 4,044,583 A | 8/1977 | Kinney, Jr. | |
| 4,074,105 A | 2/1978 | Minehisa et al. | |
| 4,097,004 A | 6/1978 | Reese | 242/129 |
| 4,102,483 A | 7/1978 | Ueyama et al. | |
| 4,113,795 A | 9/1978 | Izawa et al. | 524/84 |
| 4,127,590 A | 11/1978 | Endo et al. | 260/346.74 |
| 4,157,436 A | 6/1979 | Endo et al. | 528/1.67 |
| 4,161,248 A | 7/1979 | Kalmanovitch | 206/389 |
| 4,171,783 A | 10/1979 | Waltemath | 242/128 |
| 4,172,375 A | 10/1979 | Rushforth et al. | |
| 4,188,526 A | 2/1980 | Asano | |
| 4,222,535 A | 9/1980 | Hosbein | 242/128 |
| 4,254,322 A | 3/1981 | Asano | |
| 4,274,607 A | 6/1981 | Priest | 242/163 |
| 4,280,951 A | 7/1981 | Saito et al. | 524/118 |
| 4,293,103 A | 10/1981 | Tsukamoto | |
| 4,354,487 A | 10/1982 | Oczkowski et al. | 604/366 |
| 4,392,606 A | 7/1983 | Frernion | 206/600 |
| 4,396,797 A | 8/1983 | Sakuragi et al. | 174/68 |
| 4,429,001 A | 1/1984 | Kolpin et al. | 442/340 |
| 4,451,014 A | 5/1984 | Kitt et al. | 242/128 |
| 4,464,919 A | 8/1984 | Labbe | |
| 4,500,315 A | 2/1985 | Pieniak et al. | 604/379 |
| 4,531,040 A | 7/1985 | Nawa | 219/136 |
| 4,540,225 A | 9/1985 | Johnson et al. | 439/192 |
| 4,546,631 A | 10/1985 | Eisinger | |
| 4,575,612 A | 3/1986 | Prunier | 219/137.43 |
| 4,581,514 A * | 4/1986 | Inoue | G01B 21/06 204/225 |
| 4,582,198 A | 4/1986 | Ditton | |
| 4,585,487 A | 4/1986 | Destree et al. | |
| 4,623,063 A | 11/1986 | Balkin | |
| 4,737,567 A | 4/1988 | Matsumoto et al. | 528/167 |
| 4,742,088 A | 5/1988 | Kim | 521/118 |
| 4,826,497 A | 5/1989 | Marcus et al. | 604/359 |
| 4,855,179 A | 8/1989 | Bourland et al. | 442/409 |
| 4,868,366 A | 9/1989 | Toseph et al. | 219/137.71 |
| 4,869,367 A | 9/1989 | Kawasaki et al. | 206/409 |
| 4,891,493 A | 1/1990 | Sato et al. | 219/137 |
| 4,916,282 A | 4/1990 | Chamming et al. | 219/69.2 |
| 4,918,286 A | 4/1990 | Boyer | 219/137.44 |
| 4,949,567 A | 8/1990 | Corbin | 72/164 |
| 4,974,789 A | 12/1990 | Milburn | 242/159 |
| 5,051,539 A | 9/1991 | Leathers-Wiessner | 174/15.7 |
| 5,061,259 A | 10/1991 | Goldman et al. | 604/368 |
| 5,078,269 A | 1/1992 | Dekko et al. | 206/397 |
| 5,100,397 A | 3/1992 | Poccia et al. | 604/365 |
| 5,105,943 A | 4/1992 | Lesko et al. | 206/397 |
| 5,109,983 A | 5/1992 | Malone et al. | 206/408 |
| 5,147,646 A | 9/1992 | Graham | 424/424 |
| 5,165,217 A | 11/1992 | Sobel et al. | 242/159 |
| 5,201,419 A | 4/1993 | Hayes | 206/409 |
| 5,205,412 A | 4/1993 | Krieg | 206/394 |
| 5,215,338 A | 6/1993 | Kimura et al. | 285/166 |
| 5,227,314 A | 7/1993 | Brown et al. | 437/10 |
| 5,261,625 A | 11/1993 | Lanoue | 242/129.8 |
| 5,277,314 A | 1/1994 | Cooper et al. | 206/398 |
| 5,314,111 A | 5/1994 | Takaku et al. | 229/110 |
| 5,368,245 A | 11/1994 | Fore | 242/171 |
| 5,372,269 A | 12/1994 | Sutton et al. | 220/62 |
| 5,452,841 A | 9/1995 | Sibata et al. | 228/180.5 |
| 5,485,968 A | 1/1996 | Fujioka | 242/172 |
| 5,494,160 A | 2/1996 | Gelmetti | 206/395 |
| 5,530,088 A | 6/1996 | Sheen et al. | 528/287 |
| 5,553,810 A | 9/1996 | Bobeczko | 242/601 |
| 5,562,646 A | 10/1996 | Goldman et al. | 604/368 |
| 5,585,013 A | 12/1996 | Truty | 219/69.12 |
| 5,586,733 A | 12/1996 | Miura et al. | 242/125.2 |
| 5,590,848 A | 1/1997 | Shore et al. | 242/361 |
| 5,629,377 A | 5/1997 | Burgert et al. | 524/832 |
| 5,665,801 A | 9/1997 | Chang et al. | 524/125 |
| 5,692,700 A | 12/1997 | Bobeczko | 242/588.2 |
| 5,714,156 A | 2/1998 | Schmidt et al. | 424/404 |
| 5,738,209 A | 4/1998 | Burr et al. | 206/397 |
| 5,739,704 A | 4/1998 | Clark | 326/62 |
| 5,746,380 A | 5/1998 | Chung | 242/171 |
| 5,758,834 A | 6/1998 | Dragoo et al. | 242/128 |
| 5,778,939 A | 7/1998 | Hok-Yin | 138/120 |
| 5,816,466 A | 10/1998 | Seufer | 226/187 |
| 5,819,934 A | 10/1998 | Cooper | 206/397 |
| 5,845,862 A | 12/1998 | Cipriani | 242/423.1 |
| 5,847,184 A | 12/1998 | Kleiner | 558/73 |
| 5,865,051 A | 2/1999 | Otzen et al. | 72/17.3 |
| 5,921,391 A | 7/1999 | Ortiz et al. | 206/397 |
| 5,931,408 A | 8/1999 | Ishii et al. | 242/580 |
| 5,932,123 A | 8/1999 | Marhofer | 219/125.11 |
| 5,971,308 A | 10/1999 | Boulton | 242/131 |
| 5,988,370 A | 11/1999 | Roemer et al. | 206/215 |
| 5,990,377 A | 11/1999 | Chen et al. | 604/381 |
| 6,016,911 A | 1/2000 | Chen | 200/395 |
| 6,019,303 A | 2/2000 | Cooper | 424/361.4 |
| 6,103,358 A | 8/2000 | Bruggermann et al. | 428/317.9 |
| 6,150,632 A | 11/2000 | Fisher | 219/137.71 |
| 6,159,591 A | 12/2000 | Beihoffer et al. | 428/327 |

(56) References Cited

U.S. PATENT DOCUMENTS

| | | | | |
|---|---|---|---|---|
| 6,236,017 B1 * | 5/2001 | Smartt | | B23K 9/093 |
| | | | | 219/130.01 |
| 6,237,768 B1 | 5/2001 | Cipriani | | 206/408 |
| 6,245,880 B1 | 6/2001 | Takeuchi et al. | | 528/287 |
| 6,255,371 B1 | 7/2001 | Schlosser et al. | | 524/100 |
| 6,260,781 B1 | 7/2001 | Cooper | | 424/361.4 |
| 6,301,944 B1 | 10/2001 | Offer | | 72/79 |
| 6,322,016 B1 | 11/2001 | Jacobsson et al. | | 424/356.4 |
| 6,340,522 B1 | 1/2002 | Burke et al. | | 428/359 |
| 6,408,888 B1 | 6/2002 | Baeumer et al. | | 138/120 |
| 6,409,116 B1 | 6/2002 | Brown | | 242/419.1 |
| 6,417,425 B1 | 7/2002 | Whitmore et al. | | 604/367 |
| 6,425,549 B1 | 7/2002 | Bae et al. | | 242/580 |
| 6,464,077 B1 | 10/2002 | Liu | | 206/388 |
| 6,479,793 B1 * | 11/2002 | Wittmann | | B23K 9/0953 |
| | | | | 219/130.5 |
| 6,481,892 B1 | 11/2002 | Agostini | | 384/43 |
| 6,498,227 B1 | 12/2002 | Horie | | 528/176 |
| 6,524,010 B1 | 2/2003 | Derman | | 384/513 |
| 6,547,176 B1 | 4/2003 | Blain et al. | | 242/423.1 |
| 6,564,943 B2 | 5/2003 | Barton et al. | | 206/395 |
| 6,613,848 B1 | 9/2003 | Wang et al. | | 525/481 |
| 6,636,776 B1 | 10/2003 | Barton et al. | | 700/169 |
| 6,648,141 B2 | 11/2003 | Land | | 206/408 |
| 6,649,870 B1 | 11/2003 | Barton et al. | | 219/137 |
| 6,708,864 B2 | 3/2004 | Ferguson, III et al. | | 228/56.3 |
| 6,715,608 B1 | 4/2004 | Moore | | 206/397 |
| 6,745,899 B1 | 6/2004 | Barton | | 206/409 |
| 6,749,139 B2 | 6/2004 | Speck | | |
| 6,750,262 B1 | 6/2004 | Hahnle et al. | | 521/64 |
| 6,753,454 B1 | 6/2004 | Smith et al. | | 602/41 |
| 6,821,454 B2 | 11/2004 | Visca et al. | | 34/341 |
| 6,831,142 B2 | 12/2004 | Mertens et al. | | 526/328.5 |
| 6,831,251 B1 | 12/2004 | Artelsmair | | B23K 9/1336 |
| 6,872,275 B2 | 3/2005 | Ko et al. | | 156/181 |
| 6,889,835 B2 | 5/2005 | Land | | 206/408 |
| 6,913,145 B2 | 7/2005 | Barton | | 206/409 |
| 6,938,767 B2 | 9/2005 | Gelmetti | | 206/408 |
| 6,977,357 B2 | 12/2005 | Hsu et al. | | 219/130.01 |
| 7,004,318 B2 | 2/2006 | Barton | | 206/409 |
| 7,108,916 B2 | 9/2006 | Ehrnsperger et al. | | 428/403 |
| 7,147,176 B2 | 12/2006 | Rexhaj | | 242/417.3 |
| 7,152,735 B2 | 12/2006 | Dragoo et al. | | 206/408 |
| 7,156,334 B1 | 1/2007 | Fore et al. | | 242/171 |
| 7,178,755 B2 | 2/2007 | Hsu et al. | | 242/423.1 |
| 7,198,152 B2 | 4/2007 | Barton et al. | | 206/409 |
| 7,220,942 B2 | 5/2007 | Barton et al. | | 219/137.7 |
| 7,301,124 B2 | 11/2007 | Kaufman | | 219/137.71 |
| 7,309,038 B2 | 12/2007 | Carroscia | | 206/409 |
| 7,377,388 B2 | 5/2008 | Hsu et al. | | 206/389 |
| RE40,351 E | 6/2008 | Cipriani | | 242/423.1 |
| 7,398,881 B2 | 7/2008 | Barton et al. | | 206/408 |
| 7,410,111 B2 | 8/2008 | Carroscia | | 242/566 |
| 7,441,657 B2 | 10/2008 | Gelmetti | | 206/393 |
| 7,441,721 B2 | 10/2008 | Bae et al. | | 242/174 |
| 7,533,906 B2 | 5/2009 | Luettgen et al. | | 285/146.1 |
| 7,563,840 B2 | 7/2009 | Ye | | 524/449 |
| 7,748,530 B2 | 7/2010 | Hsu et al. | | 206/408 |
| 7,950,523 B2 | 5/2011 | Gelmetti | | 206/408 |
| 8,207,475 B2 | 6/2012 | Minato et al. | | 219/137.31 |
| 8,225,977 B2 | 7/2012 | Meckler | | 226/1 |
| 8,235,210 B2 | 8/2012 | De Lacerda et al. | | 206/393 |
| 9,414,759 B2 * | 8/2016 | Lang | | A61B 5/04087 |
| 2001/0014706 A1 | 8/2001 | Sprenger et al. | | 523/400 |
| 2001/0020663 A1 * | 9/2001 | Petersen | | B65H 63/00 |
| | | | | 242/485.7 |
| 2002/0000391 A1 | 1/2002 | Kawasai et al. | | 206/408 |
| 2002/0003014 A1 | 1/2002 | Homma | | |
| 2002/0014477 A1 | 2/2002 | Lee et al. | | |
| 2002/0039869 A1 | 4/2002 | Achille | | 442/417 |
| 2002/0108985 A1 | 8/2002 | Garcia et al. | | 226/45 |
| 2002/0120178 A1 | 8/2002 | Tartaglia et al. | | 600/114 |
| 2003/0042162 A1 | 3/2003 | Land | | 206/408 |
| 2003/0042163 A1 | 3/2003 | Cipriant | | |
| 2003/0052030 A1 | 3/2003 | Gelmetti | | 206/397 |
| 2003/0184086 A1 | 10/2003 | Christianson | | 285/146.1 |
| 2004/0011776 A1 | 1/2004 | Mukai | | B23K 9/1336 |
| 2004/0020041 A1 | 2/2004 | Ferguson, III et al. | | |
| 2004/0050441 A1 | 3/2004 | Roschi | | 138/120 |
| 2004/0133176 A1 | 7/2004 | Muthiah et al. | | 604/368 |
| 2004/0155090 A1 | 8/2004 | B-Jensen | | |
| 2004/0176557 A1 | 9/2004 | Mertens et al. | | 526/328.5 |
| 2004/0186244 A1 | 9/2004 | Hatsuda et al. | | 525/451 |
| 2004/0201117 A1 | 10/2004 | Anderson | | 264/4.3 |
| 2004/0241333 A1 | 12/2004 | Cielenski et al. | | 427/421.1 |
| 2004/0265387 A1 | 12/2004 | Hermeling et al. | | 424/486 |
| 2005/0008776 A1 | 1/2005 | Chhabra et al. | | 427/180 |
| 2005/0258290 A1 | 11/2005 | Kuper | | 242/171 |
| 2005/0261461 A1 | 11/2005 | Maeda et al. | | 528/272 |
| 2006/0016792 A1 | 1/2006 | Uecker et al. | | 219/137.71 |
| 2006/0027699 A1 | 2/2006 | Bae et al. | | |
| 2006/0070987 A1 * | 4/2006 | Daniel | | B23K 9/12 |
| | | | | 219/137.71 |
| 2006/0074154 A1 | 4/2006 | Harashina et al. | | 524/115 |
| 2006/0131293 A1 * | 6/2006 | Kaufman | | B23K 9/124 |
| | | | | 219/137.71 |
| 2006/0138116 A1 * | 6/2006 | Lipnevicius | | B23K 9/124 |
| | | | | 219/137.71 |
| 2006/0155254 A1 | 7/2006 | Sanz et al. | | 604/378 |
| 2006/0207981 A1 * | 9/2006 | Diekmann | | B23K 9/1336 |
| | | | | 219/137.2 |
| 2006/0247343 A1 | 11/2006 | Kishimoto et al. | | 524/117 |
| 2006/0258824 A1 | 11/2006 | Oshima et al. | | 525/533 |
| 2006/0278747 A1 | 12/2006 | Carroscia | | |
| 2007/0056943 A1 | 3/2007 | Tenbrink | | 219/130.01 |
| 2007/0151964 A1 | 7/2007 | Artelsmair et al. | | 219/137.2 |
| 2007/0158324 A1 | 7/2007 | O'Donnell et al. | | 219/137.71 |
| 2007/0175786 A1 | 8/2007 | Nicklas | | |
| 2007/0175965 A1 | 8/2007 | Carroscia | | 228/4.5 |
| 2007/0272573 A1 | 11/2007 | Gelmetti | | |
| 2007/0284754 A1 | 12/2007 | Laymon | | 219/137.51 |
| 2008/0156925 A1 | 7/2008 | Cooper | | 242/559.3 |
| 2008/0257874 A1 | 10/2008 | Kaufman et al. | | 219/137 R |
| 2008/0257875 A1 | 10/2008 | De Keizer | | 219/137.44 |
| 2008/0300349 A1 | 12/2008 | Fuchikami et al. | | 524/117 |
| 2008/0314876 A1 | 12/2008 | Pinsonneault et al. | | 219/74 |
| 2009/0014572 A1 | 1/2009 | Weissbrod et al. | | |
| 2009/0014579 A1 | 1/2009 | Bender et al. | | |
| 2009/0200284 A1 | 8/2009 | Sanchez | | 219/137.51 |
| 2010/0116803 A1 | 5/2010 | Gelmetti | | 219/138 |
| 2011/0042355 A1 * | 2/2011 | Gelmetti | | B23K 9/1333 |
| | | | | 219/73 |
| 2011/0073703 A1 | 3/2011 | Gelmetti et al. | | 242/615.2 |
| 2011/0094911 A1 | 4/2011 | Gelmetti | | 206/408 |
| 2011/0114523 A1 | 5/2011 | Gelmetti | | 206/407 |
| 2011/0114617 A1 | 5/2011 | Gelmetti et al. | | 219/137.9 |
| 2011/0132880 A1 | 6/2011 | Kossowan | | 219/76.14 |
| 2012/0160819 A1 | 6/2012 | Enyedy | | 219/137.71 |
| 2012/0298630 A1 | 11/2012 | Stoutamire | | 219/75 |
| 2013/0112676 A1 | 5/2013 | Hutchison | | B23K 9/09 |
| 2013/0180971 A1 | 7/2013 | Peters et al. | | 219/137.7 |
| 2013/0193124 A1 | 8/2013 | Peters | | 219/121.63 |
| 2013/0193259 A1 | 8/2013 | Weissbrod et al. | | 242/566 |
| 2013/0200055 A1 * | 8/2013 | Enyedy | | B23K 9/124 |
| | | | | 219/130.21 |
| 2014/0076872 A1 | 3/2014 | Ott | | 219/132 |

FOREIGN PATENT DOCUMENTS

| | | | | |
|---|---|---|---|---|
| CN | 202240091 | 5/2012 | | B23K 9/133 |
| DE | 1011840 B | 7/1957 | | B21C 47/04 |
| DE | 1082215 | 11/1957 | | B21C 47/10 |
| DE | 1 154 624 | 9/1963 | | C08G 59/40 |
| DE | 2 148 348 | 4/1973 | | D01F 7/04 |
| DE | 2122958 | 7/1973 | | B21C 47/14 |
| DE | 2202177 | 7/1973 | | B65H 54/80 |
| DE | 2525938 | 12/1976 | | B23K 9/18 |
| DE | 26 46 218 | 4/1977 | | C07F 9/32 |
| DE | 28 16 100 | 10/1978 | | C08G 63/68 |
| DE | 36 09 839 | 10/1989 | | F16L 57/00 |
| DE | 19909214 | 3/1999 | | C08J 9/20 |
| DE | 199 10 128 | 1/2001 | | A61B 1/008 |
| DE | 19958697 | 6/2001 | | B01J 20/00 |

(56) References Cited

FOREIGN PATENT DOCUMENTS

| | | | |
|---|---|---|---|
| DE | 100 06 592 | 8/2001 | ............ C08G 59/18 |
| DE | 10202839 | 1/2002 | ............ B01J 13/00 |
| DE | 103 60 466 | 7/2005 | ............ B23K 9/133 |
| DE | 102007015946 | 10/2008 | ............ B23K 9/133 |
| DE | 202011104120 | 1/2012 | ............ B23K 9/133 |
| EP | 0017445 | 10/1980 | ............ B65H 59/10 |
| EP | 0408259 | 4/1992 | |
| EP | 0519424 A1 | 12/1992 | ............ B23K 9/1333 |
| EP | 0584056 | 2/1994 | ............ B65D 85/04 |
| EP | 0665 166 | 1/1995 | ............ B65D 5/44 |
| EP | 0686439 A1 | 12/1995 | ............ B21C 47/14 |
| EP | 0806429 | 11/1997 | ............ C07F 9/655 |
| EP | 1057751 A1 | 12/2000 | |
| EP | 1 070 754 | 1/2001 | ............ C09K 21/10 |
| EP | 1 275 595 | 1/2003 | ............ B65D 85/04 |
| EP | 1 295 813 | 3/2003 | ............ B65D 85/04 |
| EP | 1357059 | 10/2003 | ............ B65D 85/04 |
| EP | 1 471 024 | 10/2004 | ............ B65H 49/08 |
| EP | 1 698 421 | 6/2006 | ............ B23K 9/133 |
| EP | 1 974 846 | 10/2008 | ............ B23K 9/133 |
| EP | 2 256 064 | 1/2010 | ............ B65H 49/08 |
| EP | 2 354 039 | 1/2010 | ............ B65D 85/04 |
| EP | 2 168 706 | 3/2010 | ............ B23K 9/133 |
| EP | 2 286 950 | 2/2011 | ............ B23K 9/133 |
| EP | 2695696 | 2/2014 | ............ B23K 9/12 |
| EP | 2949416 | 12/2015 | ............ B23K 9/133 |
| FR | 1215111 | 4/1960 | ............ B21C 47/10 |
| FR | 2055181 | 5/1971 | ............ B23K 35/02 |
| FR | 2 267 255 | 4/1974 | |
| FR | 2595674 | 3/1988 | ............ B21C 47/14 |
| FR | 2 888 825 | 1/2007 | ............ B65H 57/14 |
| GB | 880502 | 10/1961 | ............ B21C 47/14 |
| GB | 1168928 | 10/1969 | ............ D07B 7/10 |
| GB | 1229913 | 4/1971 | ............ B21C 47/14 |
| GB | 1 575 157 | 9/1980 | ............ C09K 21/12 |
| GB | 2059462 | 4/1981 | ............ A23G 3/02 |
| GB | 2 264 482 | 9/1993 | |
| GB | 2 332 451 | 6/1999 | ............ B65H 57/18 |
| JP | 49-13065 | 2/1974 | |
| JP | 54-035842 | 3/1979 | ............ B65D 1/28 |
| JP | 54-043856 | 4/1979 | |
| JP | 55-054295 | 4/1980 | ............ B23K 35/02 |
| JP | 55112176 | 8/1980 | ............ B23K 9/12 |
| JP | 55-156694 | 12/1980 | ............ B23K 35/368 |
| JP | 56-023376 | 3/1981 | ............ B23K 9/00 |
| JP | 57-102471 | 6/1982 | ............ B23K 54/82 |
| JP | 58-035068 | 3/1983 | ............ B23K 9/12 |
| JP | 58-70384 | 5/1983 | ............ B65D 85/04 |
| JP | 59-197386 | 11/1984 | ............ B23K 11/30 |
| JP | 59-229287 | 12/1984 | ............ B23K 9/12 |
| JP | 59-232669 | 12/1984 | ............ B23K 9/12 |
| JP | 60-021181 | 2/1985 | ............ B23K 9/12 |
| JP | 60-032281 | 2/1985 | ............ C04B 41/82 |
| JP | 60-082275 | 5/1985 | ............ B23K 9/12 |
| JP | 60-082276 | 5/1985 | ............ B23K 9/12 |
| JP | 60-184422 | 9/1985 | ............ B21C 47/26 |
| JP | 60-223664 | 11/1985 | ............ B23K 9/12 |
| JP | 61-162541 A | 7/1986 | ............ C08K 5/49 |
| JP | 61-293674 | 12/1986 | ............ B23K 9/12 |
| JP | 62-009774 | 1/1987 | ............ B23K 9/12 |
| JP | 62-111872 | 5/1987 | ............ B65H 49/08 |
| JP | 62-287055 | 12/1987 | ............ C22F 1/10 |
| JP | 63-147781 | 6/1988 | ............ B65H 59/06 |
| JP | 1-65265 | 4/1989 | ............ C23C 14/56 |
| JP | 1-240222 | 9/1989 | |
| JP | 3-264169 | 11/1991 | ............ B23K 9/133 |
| JP | 03264169 A | 11/1991 | ............ B23K 9/133 |
| JP | 4-112169 | 4/1992 | ............ B23K 9/12 |
| JP | 04-133973 | 5/1992 | ............ B65H 59/06 |
| JP | 4-274875 | 9/1992 | ............ B21C 47/04 |
| JP | H05104248 | 4/1993 | ............ B23K 9/10 |
| JP | 5-178538 | 7/1993 | ............ B65H 59/06 |
| JP | 7-247058 | 9/1995 | ............ B21C 47/24 |
| JP | 8-40642 | 2/1996 | ............ B21C 47/28 |
| JP | 08-150492 | 6/1996 | ............ B23K 35/02 |
| JP | 08-267274 | 10/1996 | ............ B23K 35/30 |
| JP | 2000-202630 | 7/2000 | ............ B23K 9/133 |
| JP | 2000-225468 | 8/2000 | ............ B23K 9/12 |
| JP | 2000-263239 | 9/2000 | ............ B23K 11/00 |
| JP | 2001-26375 | 1/2001 | ............ B65H 75/16 |
| JP | 2001-150187 | 6/2001 | ............ B21D 3/06 |
| JP | 2001-323268 A | 11/2001 | ............ C07F 9/6574 |
| JP | 2004-025242 | 1/2004 | ............ B23K 35/20 |
| JP | 2004-025243 | 1/2004 | ............ B23K 9/12 |
| JP | 2005-169499 | 6/2005 | ............ B23K 9/133 |
| JP | 2007-927 | 1/2007 | ............ B23K 9/133 |
| JP | 2007-29971 | 2/2007 | ............ B23K 9/133 |
| KR | 2002-0077857 | 10/2002 | ............ B65D 85/04 |
| SU | 793678 | 1/1981 | ............ B21C 47/02 |
| SU | 1412830 | 7/1988 | ............ B21C 47/02 |
| WO | WO 81/03319 | 11/1981 | ............ B65D 25/52 |
| WO | WO 8810230 | 12/1988 | ............ B65H 49/08 |
| WO | WO 94-00493 | 1/1994 | ............ A61K 39/00 |
| WO | WO 94-19258 | 9/1994 | ............ B65D 5/10 |
| WO | WO 97/00878 | 1/1997 | ............ C07F 9/6571 |
| WO | WO 98/52844 | 11/1998 | ............ B65D 85/04 |
| WO | WO 00-50197 | 8/2000 | ............ B23C 19/00 |
| WO | WO 01/27365 | 4/2001 | ............ D01H 4/28 |
| WO | WO 02/094493 | 11/2002 | |
| WO | WO 03-106096 A1 | 12/2003 | ............ B21C 47/20 |
| WO | WO 2005/005704 | 1/2005 | ............ D04H 13/02 |
| WO | WO2005042201 | 5/2005 | ............ B23K 9/133 |
| WO | WO 2005/061168 | 7/2005 | |
| WO | 2006091075 | 8/2006 | ............ B23K 9/133 |
| WO | WO 2007/010171 | 7/2007 | ............ B65H 57/00 |
| WO | WO 2007/112972 | 10/2007 | ............ B23K 9/133 |
| WO | WO 2007/149689 | 12/2007 | ............ B65H 57/18 |
| WO | WO 2009/007845 | 1/2009 | ............ B23K 9/133 |
| WO | WO2009027784 | 3/2009 | ............ B23K 9/133 |
| WO | WO 2009/143917 | 12/2009 | ............ B65H 57/14 |
| WO | WO 2011/147565 | 1/2011 | ............ B23K 9/133 |
| WO | WO 2013/092658 | 6/2013 | ............ B65H 57/18 |

OTHER PUBLICATIONS

Chinese Official Action dated Mar. 17, 2010.
EPO Office Action issued for related application No. 09753572.8, dated May 2, 2012 (5 pgs).
European Office Action for corresponding application No. 10 014 553.1-2302, dated Apr. 3, 2012 (4 pgs).
European Office Action issued for 09777298.2, dated Aug. 31, 2012 (4 pgs).
European Search Report, dated Mar. 2, 2011 (7 pgs).
European Search Report, dated Sep. 17, 2008.
Extended European Search Report issued in application No. 15168866.0, dated Dec. 22, 2015 (6 pgs).
Hansen et al., "Water Absorption and Mechanical Properties of Electrospun Structured Hydrogels", Journal of Applied Polymer Science, vol. 95, pp. 427-434 (2005).
International Preliminary Report on Patentability issued for related application No. PCT/EP2009/001285, dated Nov. 30, 2010 (7 pgs).
International Preliminary Report on Patentability, dated Sep. 16, 2010 (5 pgs).
International Preliminary Report, PCT/Ipea/409, dated Dec. 23, 2005, 7 pages.
International Search Report and Written Opinion issued in corresponding PCT Appln. No. PCT/EP2009/005246, dated Apr. 6, 2010 (9 pgs).
International Search Report issued in Applicants' underlying PCT Application Serial No. PCT/EP09/001285, dated Feb. 24, 2009 (3 pgs).
International Search Report, dated Jul. 6, 2009 (3 pgs).
Korean Official Action dated May 16, 2011, Appln. No. 2008-7005433, (3 pgs).
Office Action issued for related U.S. Appl. No. 12/618,250, dated Apr. 26, 2012 (11 pgs).
PCT International Search Report, dated Nov. 6, 2008 (18 pgs).
Search Report received in Applicant's counterpart European Patent Application Serial No. 08017572.2-2302, dated Mar. 13, 2009.

(56) References Cited

OTHER PUBLICATIONS

Search Report received in Applicant's counterpart European Patent Application Serial No. 10014216.5-1256 (8 pages), dated Apr. 14, 2011.
Search Report received in Applicant's counterpart European Patent Application Serial No. 11000892.7-2302 (8 pages), dated Jul. 19, 2011.
Search Report received in Applicant's counterpart European Patent Application Serial No. 11000236.7 (8 pages), dated Aug. 4, 2011.
Ullmanns Encyclopedia of Industrial Chemistry, Sulfuric Acid & Sulfur Trioxide to Tetrahydrofuran, Superabsorbents, $6^{th}$ Edition, vol. 35, pp. 73, 80, 86 and 89 (2003.
U.S. Official Action dated Feb. 13, 2012, issued in U.S. Appl. No. 12/917,320 (14 pgs).
U.S. Official Action dated Dec. 14, 2012, issued in U.S. Appl. No. 12/994,686 (17 pgs).
U.S. Official Action dated Mar. 5, 201.3 issued in U.S. Appl. No. 13/382,491 (33 pgs).
Notice of Allowance dated Mar. 5, 2013 issued in U.S. Appl. No. 12/593,271 (15 pgs).
Notice of Allowance dated Mar. 18, 2013 issued, in U.S. Appl. No. 12/994,686 (10 pgs).
Office Action issued in related U.S. Appl. No. 12/572,994, dated Apr. 24, 2013 (22 pgs).
Italian Search Report issued in related application No. MI20121423, dated Apr. 29, 2013 (2 pgs).
Office Action issued in related U.S. Appl. No. 13/382,491, dated Jul. 11, 2013 (15 pgs).
U.S. Office Action issued in related U.S. Appl. No. 12/572,994, dated Sep. 17, 2013 (13 pgs).
Extended European Search Report issued in related application No. 13179908.2, dated Nov. 13, 2013 (6 pgs).
Office Action issued in related U.S. Appl. No. 13/330,314, dated Feb. 28, 2014 (10 pgs).
Office Action issued in related U.S. Appl. No. 12/593,271 dated Aug. 31, 2012 (7pgs).
Office Action issued in related U.S. Appl. No. 12/572,994 dated Nov. 25, 2011 (11 pgs).
Office Action issued in related U.S. Appl. No. 12/572,994 dated Aug. 12, 2011 (13pgs).
Office Action issued in related U.S. Appl. No. 12/789,095 dated Jun. 12, 2012 (8pgs).
Notice of Allowance issued in related U.S. Appl. No. 12/917,320 dated Jun. 18, 2012 (25 pgs).
Office Action issued in U.S. Appl. No. 14/195,497, dated May 19, 2016 (35 pgs).
Office Action issued in U.S. Appl. No. 14/289,090, dated Aug. 4, 2016 (10 pgs).
European Search Report issued in application No. 16160312.1, dated Sep. 19, 2016 (7 pgs).
Office Action issued in U.S. Appl. No. 14/195,497, dated Sep. 9, 2016 (21 pgs).
Office Action issued in U.S. Appl. No. 14/195,497, dated Mar. 23, 2017 (24 pgs).
Office Action issued in U.S. Appl. No. 13/912,016, dated Apr. 21, 2017 (25 pgs).
European Office Action issued in application No. 16180212.9, dated Jan. 19, 2017 (7 pgs).
Office Action issued in U.S. Appl. No. 14/679,768, dated Jan. 30, 2017 (57 pgs).
OfficeAction issued in U.S. Appl. No. 14/289,090, dated Feb. 13, 2017 (21 pgs).
Office Action issued in U.S. Appl. No. 14/195,497, dated Sep. 7, 2017 (29 pgs).
Office Action issued in U.S. Appl. No. 14/289,090, dated Sep. 18, 2017 (27 pgs).
Office Action issued in U.S. Appl. No. 14/679,768, dated Aug. 2, 2017 (33 pgs).
Office Action issued in U.S. Appl. No. 14/850,753, dated Aug. 25, 2017 (64 pgs).
Office Action issued in U.S. Appl. No. 14/195,497, dated Feb. 23, 2018 (30 pgs).
U.S. Appl. No. 10/526,539, filed Mar. 3, 2005.
U.S. Appl. No. 10/596,697, filed Jun. 21, 2006.
U.S. Appl. No. 11/466,048, filed Aug. 21, 2006.
U.S. Appl. No. 12/545,717, filed Aug. 21, 2009.
U.S. Appl. No. 12/545,720, filed Aug. 21, 2009.
U.S. Appl. No. 12/593,271, filed Sep. 25, 2009.
U.S. Appl. No. 12/572,994, filed Oct. 2, 2009.
U.S. Appl. No. 12/618,165, filed Nov. 13, 2009.
U.S. Appl. No. 12/618,250, filed Nov. 13, 2009.
U.S. Appl. No. 12/691,554, filed Jan. 21, 2010.
U.S. Appl. No. 12/789,095, filed May 27, 2010.
U.S. Appl. No. 12/994,686, filed Nov. 24, 2010.
U.S. Appl. No. 13/330,314, filed Dec. 19, 2011.
U.S. Appl. No. 13/382,491, filed Jan. 5, 2012.
U.S. Appl. No. 13/744,394, filed Jan. 17, 2013.
U.S. Appl. No. 13/912,016, filed Jun. 6, 2013.
U.S. Appl. No. 14/030,879, filed Sep. 18, 2013.
U.S. Appl. No. 14/195,497, filed Mar. 3, 2014.
U.S. Appl. No. 14/289,090, filed May 28, 2014.
U.S. Appl. No. 14/679,768, filed Apr. 6, 2015.
U.S. Appl. No. 14/850,753, filed Sep. 10, 2015.
Notice of Allowance issued in U.S. Appl. No. 14/850,753, dated Jan. 19, 2018 (14 pgs).
Office Action issued in U.S. Appl. No. 14/289,090, dated. Jan. 4, 2018 (18 pgs).
Office Action issued in U.S. Appl. No. 14/289,090, dated Nov. 6, 2017 (6 pgs).
Office Action issued in U.S. Appl. No. 14/679,768, dated Jan. 12, 2018 (26 pgs).
Notice of Allowance issued in U.S. Appl. No. 14/850,753, dated Mar. 27, 2018 (14 pgs).

\* cited by examiner

Fig. 18

ROBOT#2 WK 26-2014

[BACK]   [EMPTY]

page 1 of 35

| DATE | TIME | SECONDS RUN (ARC-ON) | WIRE TYPE | WIRE DIAM MM | PACK WEIGHT KGS | NO. OF WHEEL TURNS | RUN (ARC) STATUS | WIRE DEPOSITED KGS |
|---|---|---|---|---|---|---|---|---|
| 23/6/14 | 17:13:36 | 24 | STEEL | 1.20 | 500 | 290 | 1 | 0.06723 |
| 23/6/14 | 17:14:00 | - | STEEL | 1.20 | 500 | 0 | 0 | 0.00000 |
| 23/6/14 | 17:14:05 | 24 | STEEL | 1.20 | 500 | 290 | 1 | 0.06723 |
| 23/6/14 | 17:14:29 | - | STEEL | 1.20 | 500 | 0 | 0 | 0.00000 |
| 23/6/14 | 17:14:34 | 24 | STEEL | 1.20 | 500 | 290 | 1 | 0.06723 |
| 23/6/14 | 17:14:58 | - | STEEL | 1.20 | 500 | 0 | 0 | 0.00000 |
| 23/6/14 | 17:15:22 | 24 | STEEL | 1.20 | 500 | 290 | 1 | 0.06723 |

Fig. 20
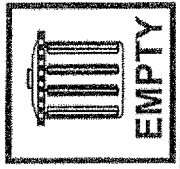
PART # 123456789
SINGLE WELD SEQUENCE ANALYSIS
| 23/6/14 | | 72 | STEEL | 1.20 | 500 | 870 | | 0.20169 |
|---|---|---|---|---|---|---|---|---|
| DATE | TIME | SECONDS RUN (ARC-ON) | WIRE TYPE | WIRE DIAM MM | PACK WEIGHT KGS | NO. OF WHEEL TURNS | RUN (ARC) STATUS | WIRE DEPOSITED KGS |
| 23/6/14 | 17:13:36 | 24 | STEEL | 1.20 | 500 | 290 | 1 | 0.06723 |
| 23/6/14 | 17:14:00 | - | STEEL | 1.20 | 500 | 0 | 0 | 0.00000 |
| 23/6/14 | 17:14:05 | 24 | STEEL | 1.20 | 500 | 290 | 1 | 0.06723 |
| 23/6/14 | 17:14:29 | - | STEEL | 1.20 | 500 | 0 | 0 | 0.00000 |
| 23/6/14 | 17:14:34 | 24 | STEEL | 1.20 | 500 | 290 | 1 | 0.06723 |
| 23/6/14 | 17:14:58 | - | STEEL | 1.20 | 500 | 0 | 0 | 0.00000 |

MODULE AND SYSTEM FOR CONTROLLING AND RECORDING WELDING DATA, AND WELDING WIRE FEEDER

The invention relates to the acquisition of data related to the feeding process of welding wire consumed in an installation for automated welding, in particular in a welding robot.

BACKGROUND OF THE INVENTION

Installations for automated welding processes such as welding robots need a large quantity of welding wire in order to minimize changeover downtime and maximize productivity. For safety and handling reasons, in modern installations the welding wire is not placed in the immediate proximity of the welding robot, but at a safer distant place where more floor space is available and the pack handling is easier. The welding wire can be supplied in the form of a large bulk pack which can contains from few to several hundreds of kilograms of welding wire. From the bulk pack, the welding wire is delivered to the welding robot by means of a welding wire liner, also called conduit, in which the welding wire is transported with minimized friction.

The welding wire is transported from the bulk pack to the welding torch mounted on the welding robot by means of a feeding system. Usually, the feeding system comprises a driving motor and one or two couples of feeding rolls which are pushing the wire through the welding torch liner into the welding torch. The feeding system ensures that the required amount of welding wire is delivered to the welding torch where it is being melted at a welding arc in order to join two base metal parts.

Even though the feeding system advances the welding wire, they do not keep a record of the actual length of welding wire being fed nor the actual weight of welding wire being deposited over a certain period of time.

BRIEF SUMMARY OF THE INVENTION

The invention provides a module for controlling and recording useful welding data and parameters like actual welding wire usage and wire feed length and time. The module has a sensor with the capability of detecting the welding wire feed motion, a processor for storing data provided by the sensor, and an output device for providing and recording the data. The invention is based on the idea of using a module or device external to the feeding system, for acquiring precise information on the speed and duration with which the welding wire is being advanced. Based on this information, a plurality of other information associated with a precise measurement of the speed and length of the welding wire can be provided as well, such as the entire amount of welding wire consumed in a certain period of time or a certain weld sequence, the length of the welding wire used for a particular welding operation, the amount of welding wire remaining in the bulk pack, the estimated time until the bulk pack containing the welding wire has to be replaced, information on the productivity and the efficiency of the respective welding robot, etc.

According to a preferred embodiment, the sensor comprises a wheel which is adapted for contacting welding wire. Due to the frictional contact between the wheel and the welding wire, the speed of rotation of the wheel precisely corresponds to the speed with which the welding wire is being advanced. This is in particular true if the wheel is not an actively driven wheel used for advancing the welding wire but only a sensor wheel entrained by the welding wire.

In a module in which the wheel is a passive wheel driven by the welding wire, an encoder is preferably provided which senses the rotation of a wheel. The signal of the encoder then is indicative of the speed with which the welding wire advances.

According to an alternative embodiment, the sensor can be a contact-free sensor. A contact-free sensor allows a determination of the speed of the welding wire without any measuring tolerances due to frictional effects.

A contact-free sensor can use one of acoustic waves and electromagnetic waves for sensing a welding wire feed motion. Sensors of these types are well-known and are used for many different applications.

According to a preferred embodiment of the invention, a touch display is provided for allowing an operator to input settings and parameters. The touch display allows adapting the module to the particular welding wire being currently used, for example the amount of welding wire contained in a bulk pack, the material of the welding wire and its diameter.

Preferably, a wire level monitoring module is provided which is adapted for warning an operator if the amount of welding wire remaining in a currently used bulk pack falls below a predefined value. The warning can for example be used to alert the operator that a replacement bulk pack has to be made available within the next hours of operation of the welding robot.

The invention also provides a system for sensing a welding wire feed motion, comprising a module for controlling welding parameters and having a sensor for detecting welding wire feed motion, a processor for storing data provided by the sensor, and an output device for providing the data, and further comprising a welding wire feeder, a module being connected to the welding wire feeder by means of a data connection which is coupled to the output device. The welding wire feeder of the system is an auxiliary feeder or boost feeder which assists a feeding system associated with the welding torch. A boost feeder is particularly advantageous if the distance between the bulk container and the welding torch is quite large, for example more than 20 meters. The boost feeder assists the feeding system associated with the welding torch while the module for controlling welding parameters senses the precise speed and length of the welding wire supplied to the welding torch.

The data connection between the module and the welding wire feeder can be an electric cable or can also comprise a wireless transmission device based on Bluetooth, Wi-Fi (WLAN) or a similar data transmission standard.

The invention also provides a welding wire feeder comprising a motor, a feeding wheel driven by the motor and adapted for advancing welding wire, a control which controls the operation of the motor, an operator interface adapted for allowing an operator to input data which being used by the control, and for making available to an operator data indicative of a welding process in which the welding wire provided by the welding wire feeder is being used. This welding wire feeder incorporates the task of sensing the welding wire speed into the auxiliary or boost feeder and can, based on this information, provide to an operator different data associated with the welding process.

The operator interface can preferably be a touch display which allows inputting different data in a very convenient manner.

The feeding wheel can be mounted in a replaceable manner to the welding wire feeder. Preferably, a quick connection coupling or a similar device is used for mounting the feeding wheel so that it can, in case of need, be very easily replaced against a different feeding wheel, for example for adapting a welding wire feeder to a different type of welding wire.

According to a preferred embodiment, an electrical data interface is provided via which data collected by the welding wire feeder can be transferred to an external device. The electrical data interface can be a USB port, an electrical plug connection, an Ethernet port, a Bluetooth port, a Wi-Fi port or a similar interface which allows transferring the data to for example an external computer. The port can also be used for providing a software update to the welding wire feeder.

The invention further provides a method for operating a welding wire feeder having a motor, a feeding wheel driven by the motor, a control of the motor operation, an operator interface adapted for allowing an operator to input data which is being used by the control, with the method comprising the steps of counting the length of welding wire supplied from the bulk container in use, and of providing an operator with information on the quantity of welding wire remaining in the bulk container in use and the welding wire already paid out from the bulk container in use. Hitherto, an operator had to frequently manually inspect the bulk pack residual content in order to assess how much welding wire was still available inside the bulk container, and the risk of suddenly running out of wire could cause sudden and unwanted interruptions of production. With the invention, the operator can now accurately determine the residual quantity welding wire inside the bulk container and this information can help him better plan the welding wire inventory levels and to optimize the pack replacement procedures, with significant reduction of changeover downtime.

According to a preferred embodiment, the control allows the operator to accurately assess the actual length of the welding wire being paid out and the residual length of welding wire still inside the bulk container, through a sequence of steps which involve the input of all relevant parameters, such like the type of welding wire, the size of the bulk container and the diameter of the wire.

In a preferred embodiment a setting procedure allows a calibration of the module based on the actual wire diameter being used, for a more precise measurement of the wire length and all related parameters: for obvious reasons the setting of parameters can only be theoretically based on the average values of a particular wire diameter, however, the international Welding Industry Standards and Norms like ISO and AWS, and all the existing welding applications, contemplate the possibility for wire diameters to range from a minimum to a maximum (normally +/−2%). Since the collected data strictly depend on the actual wire mass and diameter, the possibility to calibrate the module on the actual diameter of the welding wire in use can further increase the accuracy of the data collected. This more precise information can be particularly useful when assessing the exact amount of welding wire deposited in a limited weld sequence in order to determine with maximum accuracy the costs to weld a certain part or component.

According to a preferred embodiment, the control of the welding wire feeder calculates and makes available to an operator, important production data like the effective run time of the welding wire feeder, the actual arc-on welding time, the number of welded meters and the actual amount of wire deposited into the welded part in a selected period of time which can range from a single welding sequence to a much longer production cycle of days, weeks or months. Such information can be particularly useful to calculate the actual cost of a weld sequence or to help measure the robot productivity levels.

BRIEF DESCRIPTION OF THE DRAWINGS

Invention will now be described with reference to the enclosed drawings. In the drawings.

DETAILED DESCRIPTION OF THE INVENTION

Figure 1:
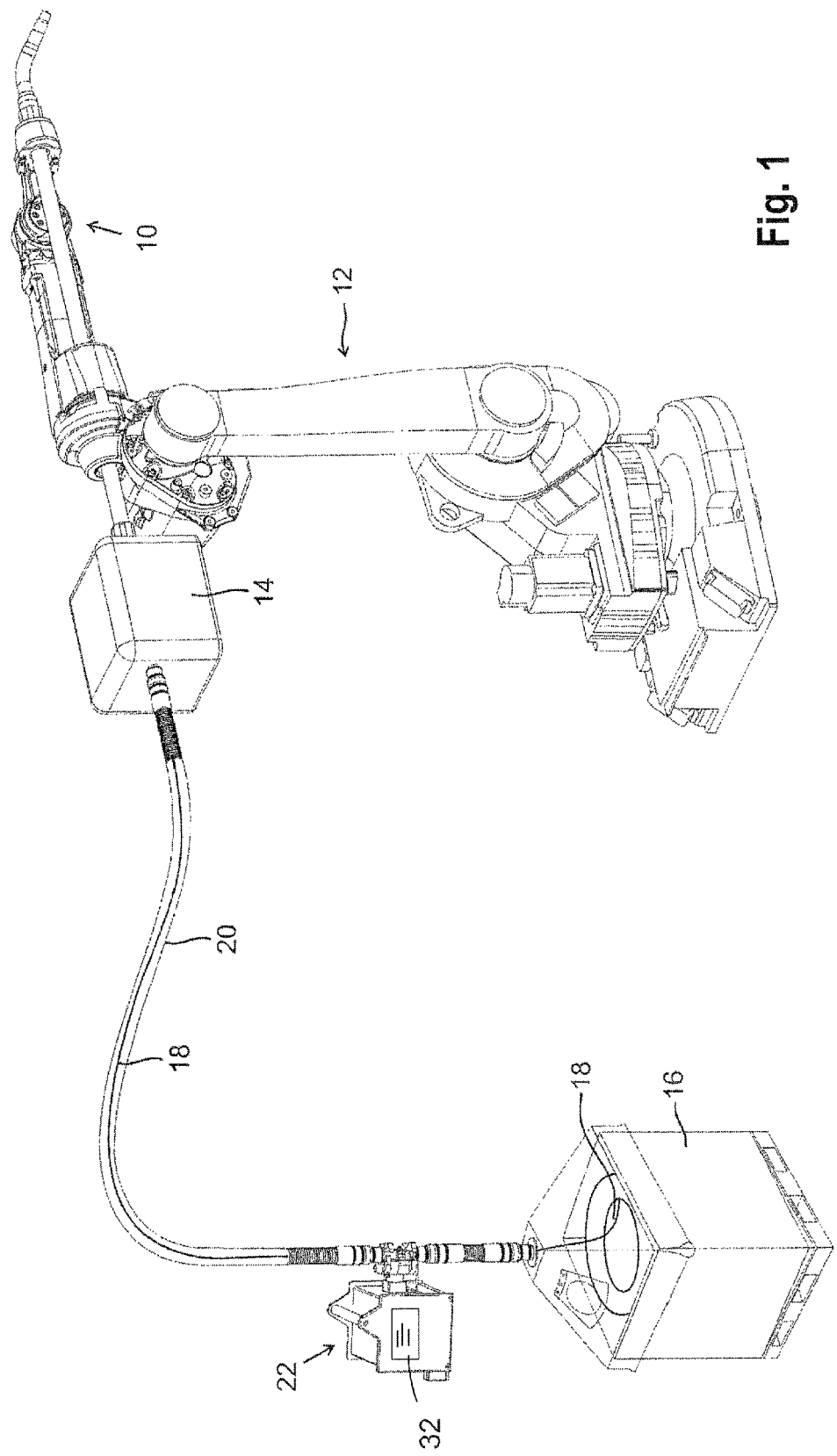
FIG. 1 shows an installation for automated welding in which a system according to the invention is being employed.

FIG. 1 shows an installation for automated welding which comprises a welding torch 10 which is here mounted on a welding robot 12. Associated with the welding robot is a main feeder 14 for feeding welding wire to welding torch 10. The welding wire is taken from a welding wire supply 16. Welding wire supply 16 is here a bulk container which contains a significant quantity of welding wire.

In view of its weight and further in view of considerations such as accessibility, available space etc., welding wire supply 16 is arranged at a distance from welding torch 10. Welding wire 18 from welding wire supply 16 is guided towards main feeder 16 and welding torch 10 by means of a wire guide 20. Wire guide 20 can be any device which allows to reliably guide the welding wire from welding wire supply 16 towards welding torch 10. Preferably, wire guide 20 is formed from a plurality of interconnected bodies which each support a couple of rolls. The rolls guide the welding wire 18 in the interior of the bodies with low friction while at the same time ensuring that the wire guide 20 can follow the movements of welding torch 10.

At a suitable location between welding wire supply 16 and main feeder 14 and preferably close to welding wire supply 16, an auxiliary welding wire feeder (also referred to as "booster feeder") 22 is arranged. The purpose of auxiliary welding wire feeder 22 is to provide a pushing effect on welding wire 16 for pushing the welding wire towards main feeder 14, or to at least assist the advancing motion of the welding wire provided by main feeder 14.

Figure 2:
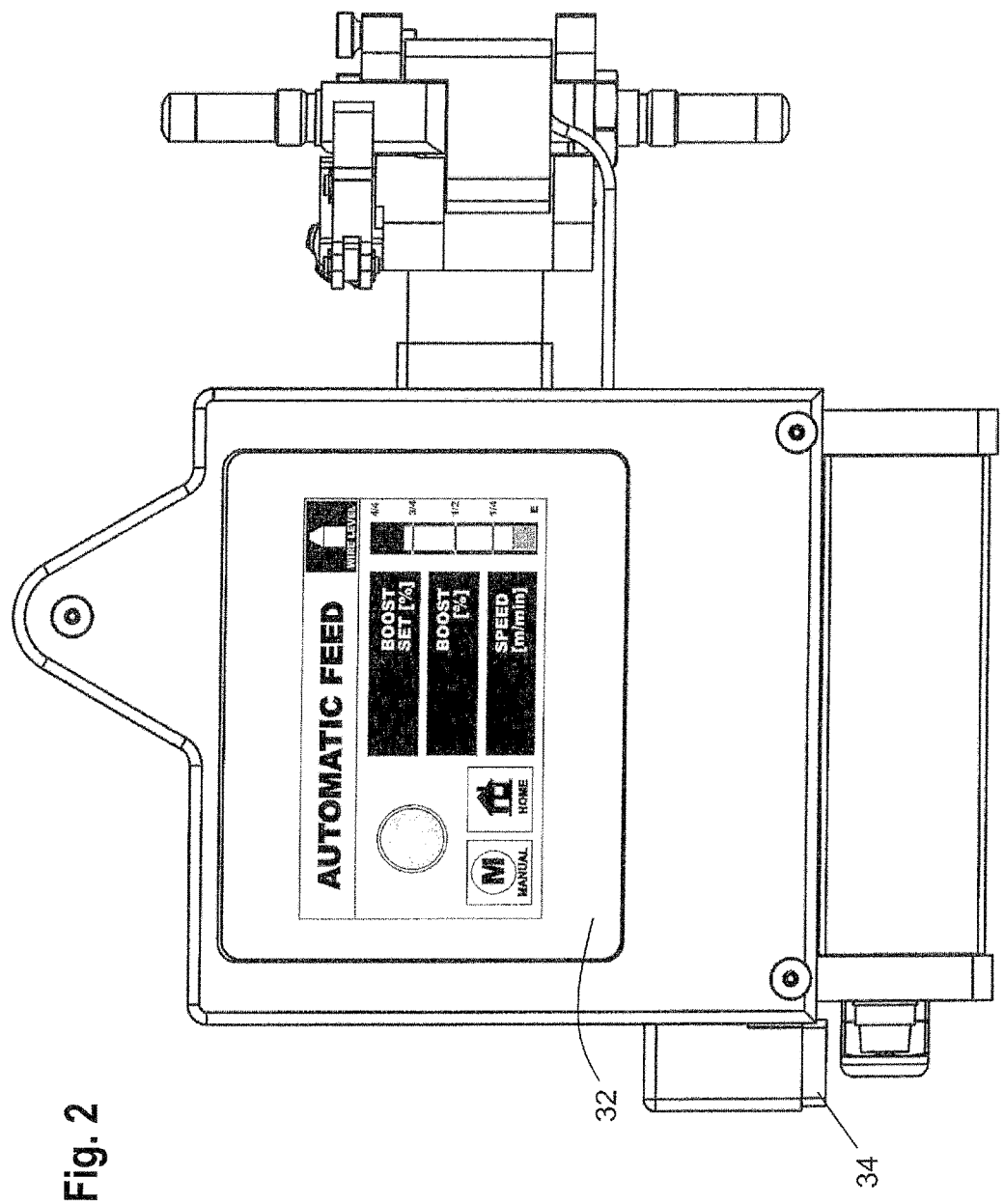
FIG. 2 shows a front view of a welding wire feeder used in the installation of FIG. 1.
Figure 3:
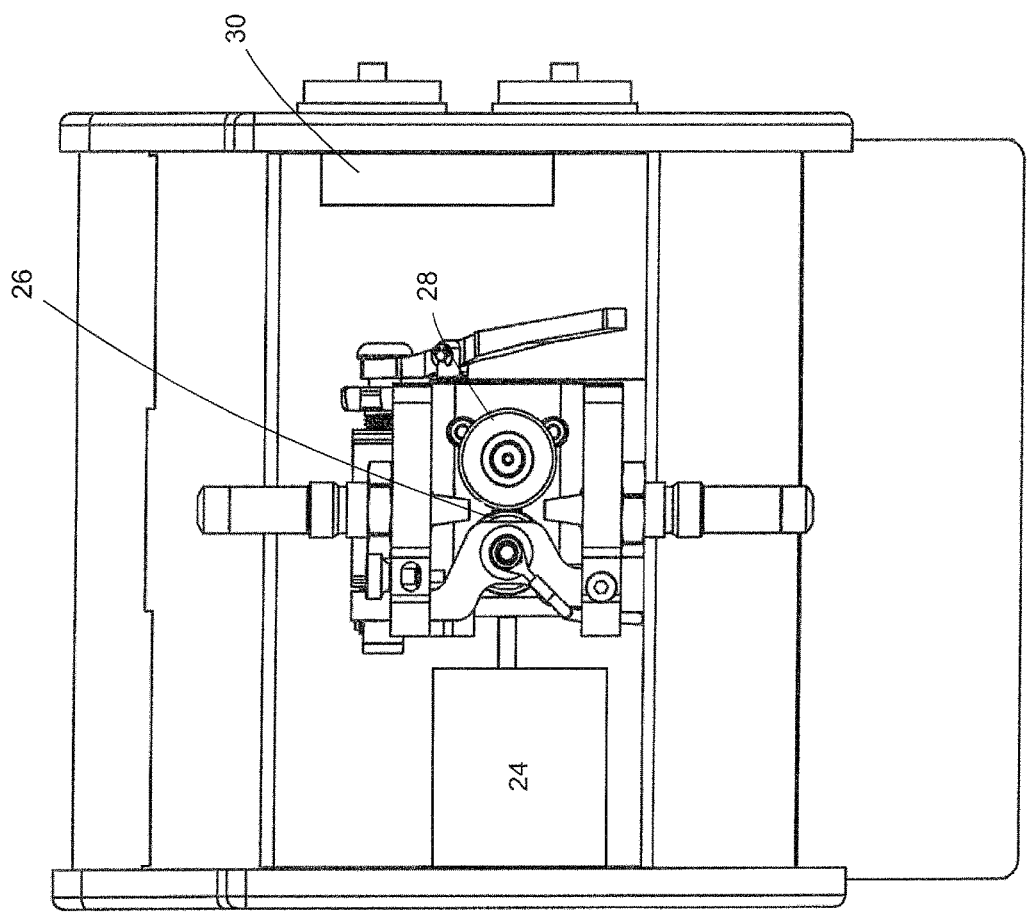
FIG. 3 shows a side view of the welding wire feeder of FIG. 2, FIGS. 4 to 21 show the touch display used in the welding wire feeder of FIG. 2, with different information being displayed on the touch screen.

Welding wire feeder 22 (please refer to FIGS. 2 and 3) comprises a schematically shown motor 24 which is operatively connected to a feeding wheel 26. Associated with feeding wheel 26 is a pressing wheel 28. The welding wire passes between feeding wheel 26 and pressing wheel 28 so that the welding wire is advanced according to the speed of feeding wheel 26 when the latter is driven by motor 24.

Further provided as part of welding wire feeder 22 is a control 30 which controls the operation of motor 24.

Welding wire feeder 22 also comprises an operator interface 32 which here takes the form of a touch display. An operator can input certain parameters into control 30 by means of operator interface 32, and the welding wire feeder 22 can make available to an operator certain data via operator interface 32.

Welding wire feeder 32 also comprises an electrical data interface 34 which is here formed as an insertion slot for a USB stick or a connecting cable of the USB standard. Electrical data interface 34 allows retrieving data stored in a processor of control 30 so as to externally process the data with dedicated computer software. The data interface can also be used for updating the software (operating system) used by welding wire feeder 22.

Operator interface 32 can display a plurality of different screens by means of which certain parameters can be requested from an operator, and by means of which operational data can be shown to an operator.

Figure 4:
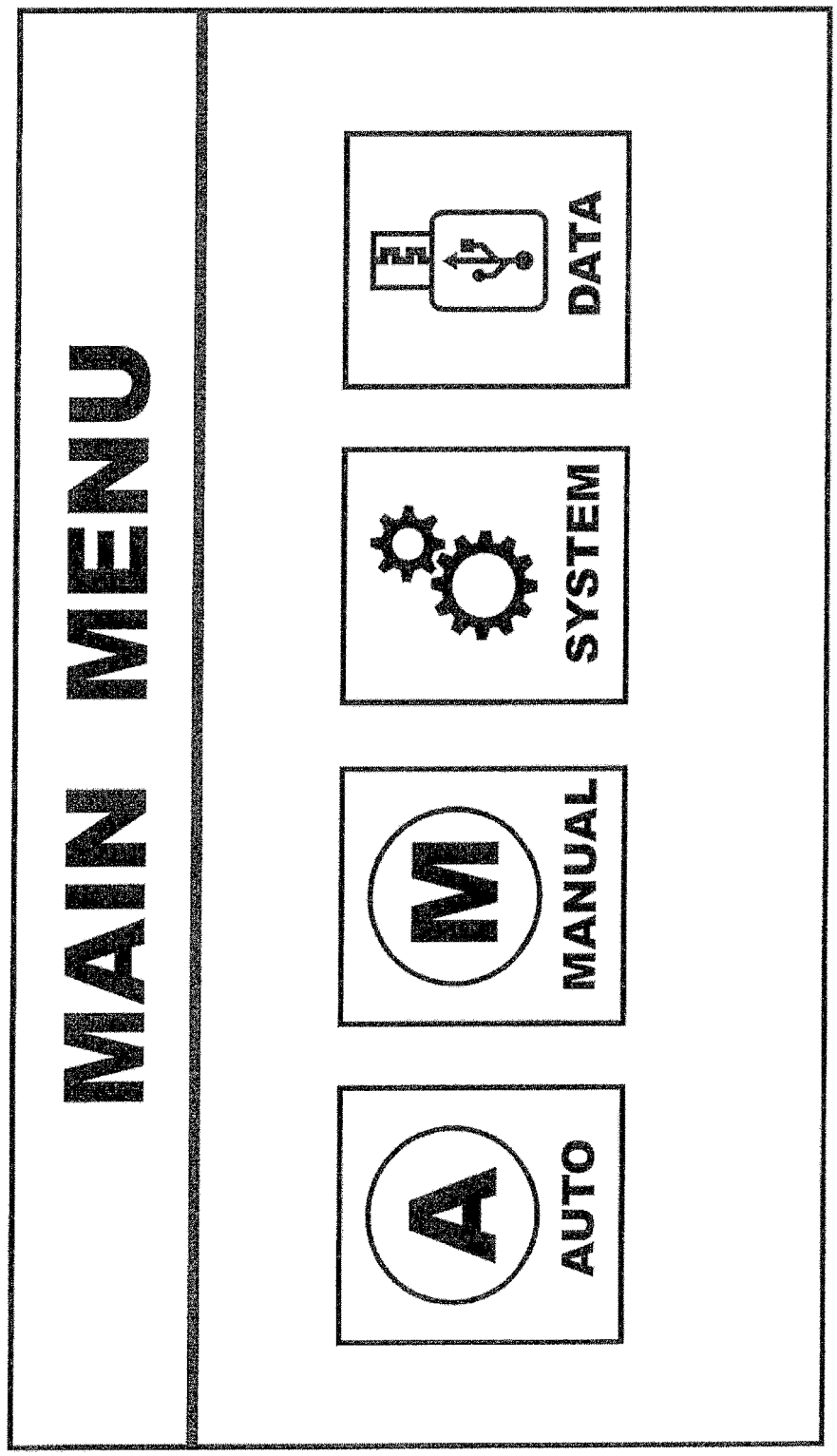

FIG. 4 shows a screen of operator interface 32 which is the main menu. This screen allows selecting an automatic feeding mode, a manual feed mode, to change settings in the system, and to change to a data exchange mode.

Figure 5:
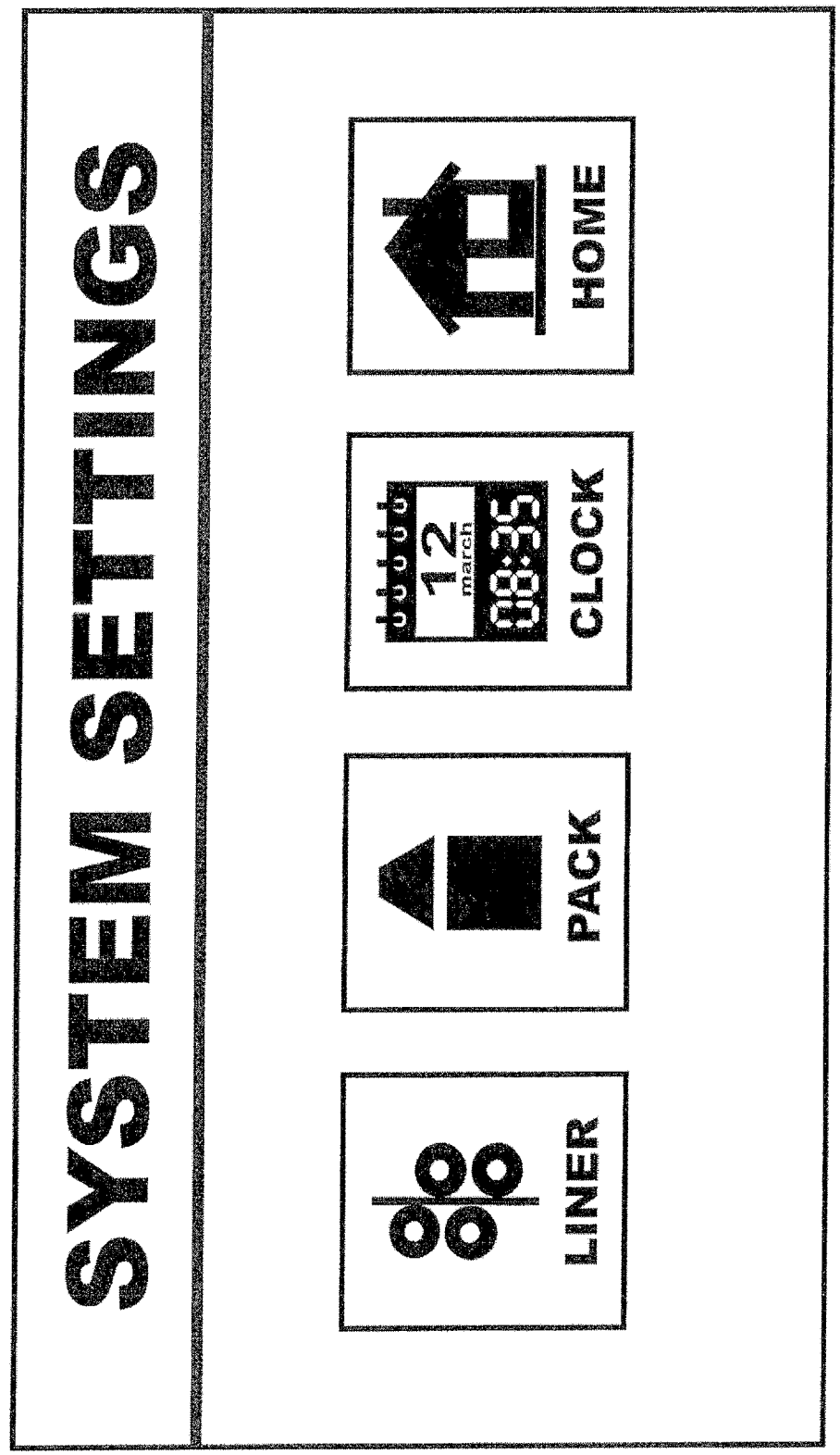
Figure 6:
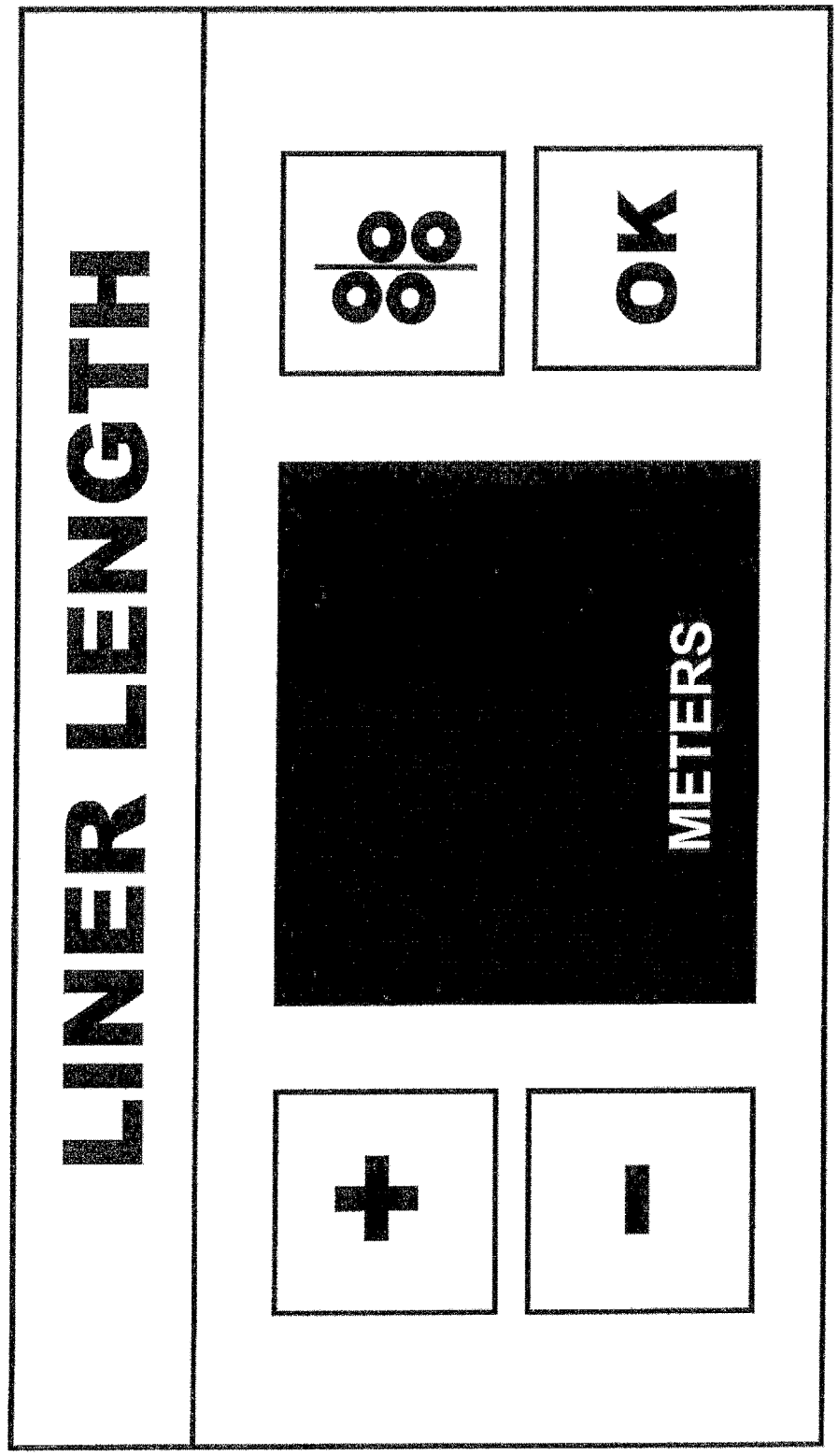

FIG. 5 shows a screen of operator interface 32 which with certain system settings can be made. One of the settings is the length of the liner (please see FIG. 6) as the length of the guiding liner between the welding wire container 16 and the welding torch has an influence on the friction occurring within the entire system and consequently on the amount of feeding force necessary for transporting welding wire 18 within guiding liner 20. Control 30 can either automatically adapt or make suggestions on the amount of assistance provided by welding wire feeder 22, depending on the length of the liner.

Figure 7:
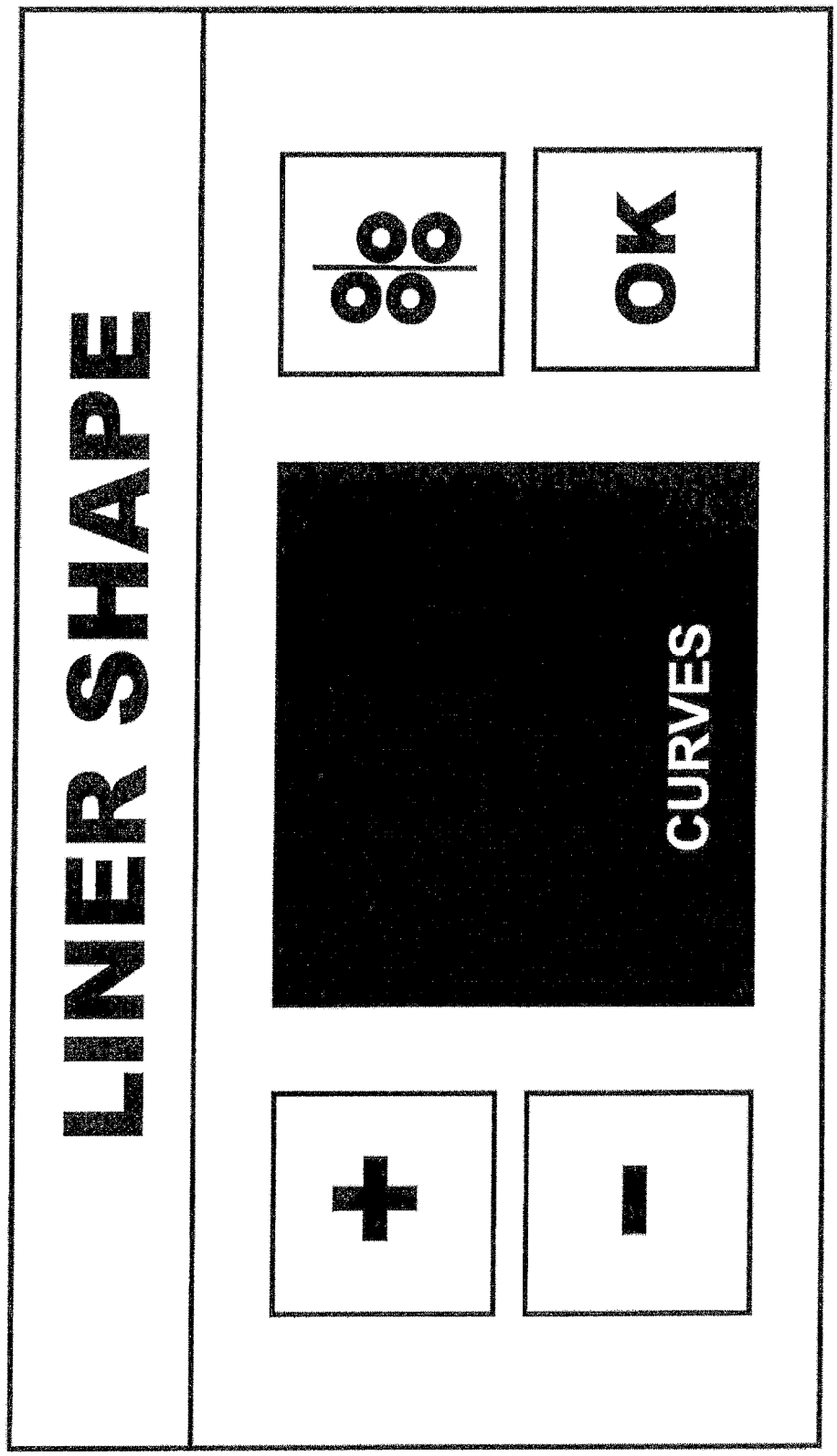

As shown in FIG. 7, operator interface 32 can also request information on the number of curves which are present between welding wire container 16 and welding torch 10, as the number of curves also has an influence on the friction occurring within the entire system.

Figure 8:
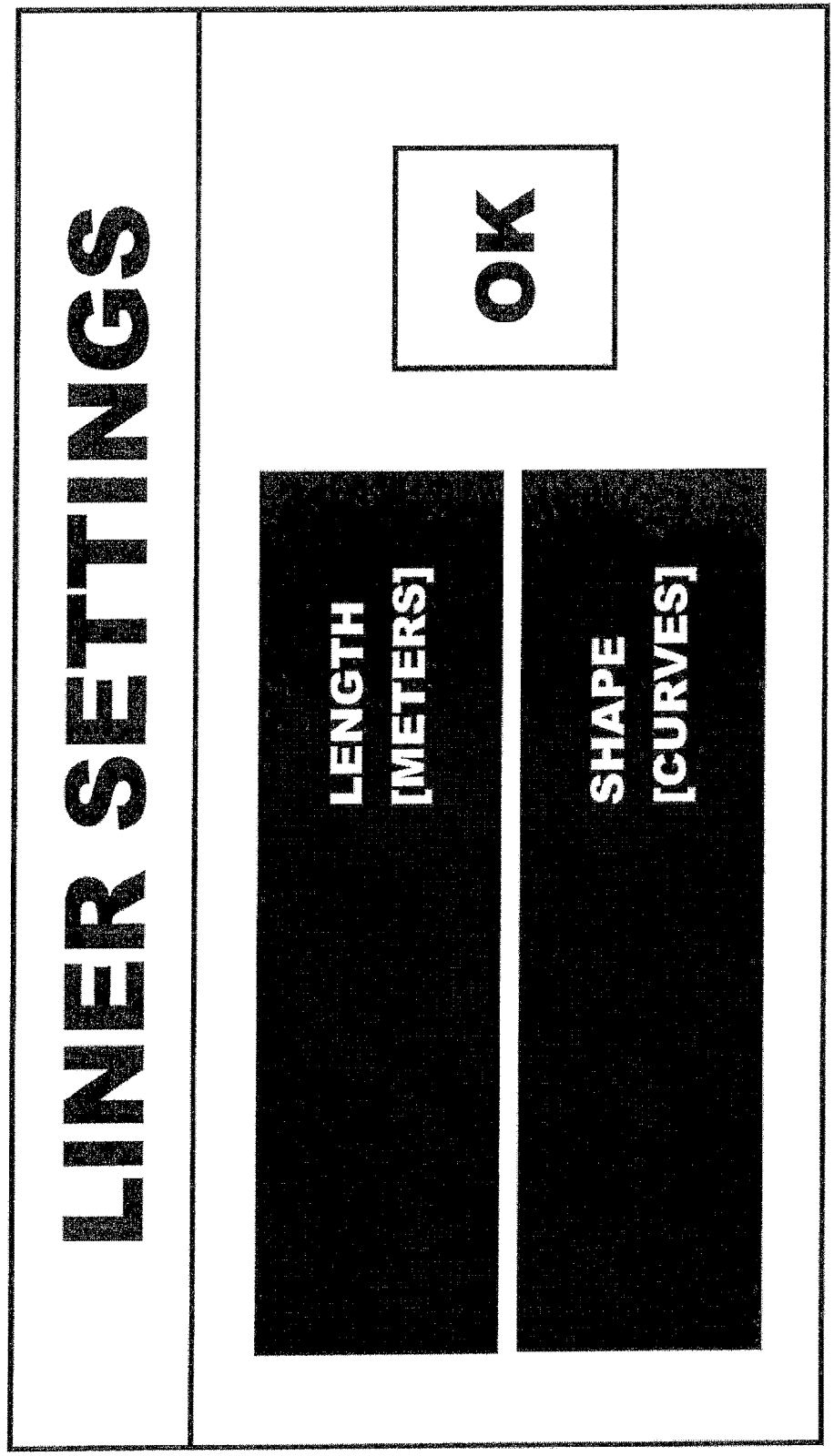

FIG. 8 shows a screen in which an operator finally confirms that the parameters previously inputted are correct.

Figure 9:
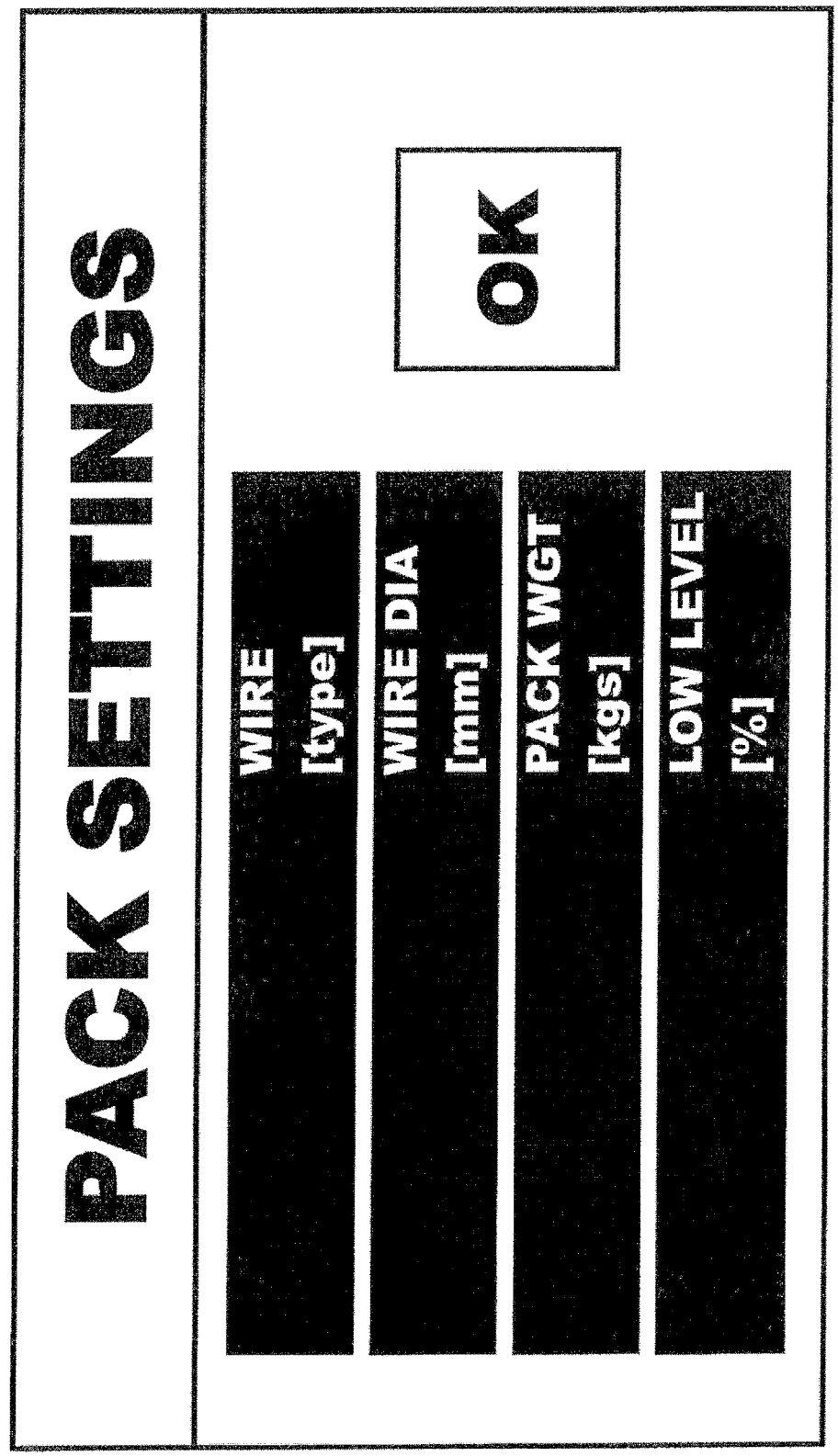

FIG. 9 shows a screen with which an operator can provide to the welding wire feeder 22 specific information on the welding wire supply. The first important parameter is the type of wire, for example aluminum wire or copper wire. The material and the resultant resistance to bending have an influence on the level of friction within guiding liner 20. The same applies with respect to the wire diameter; a thicker wire results in more friction.

Figure 10:
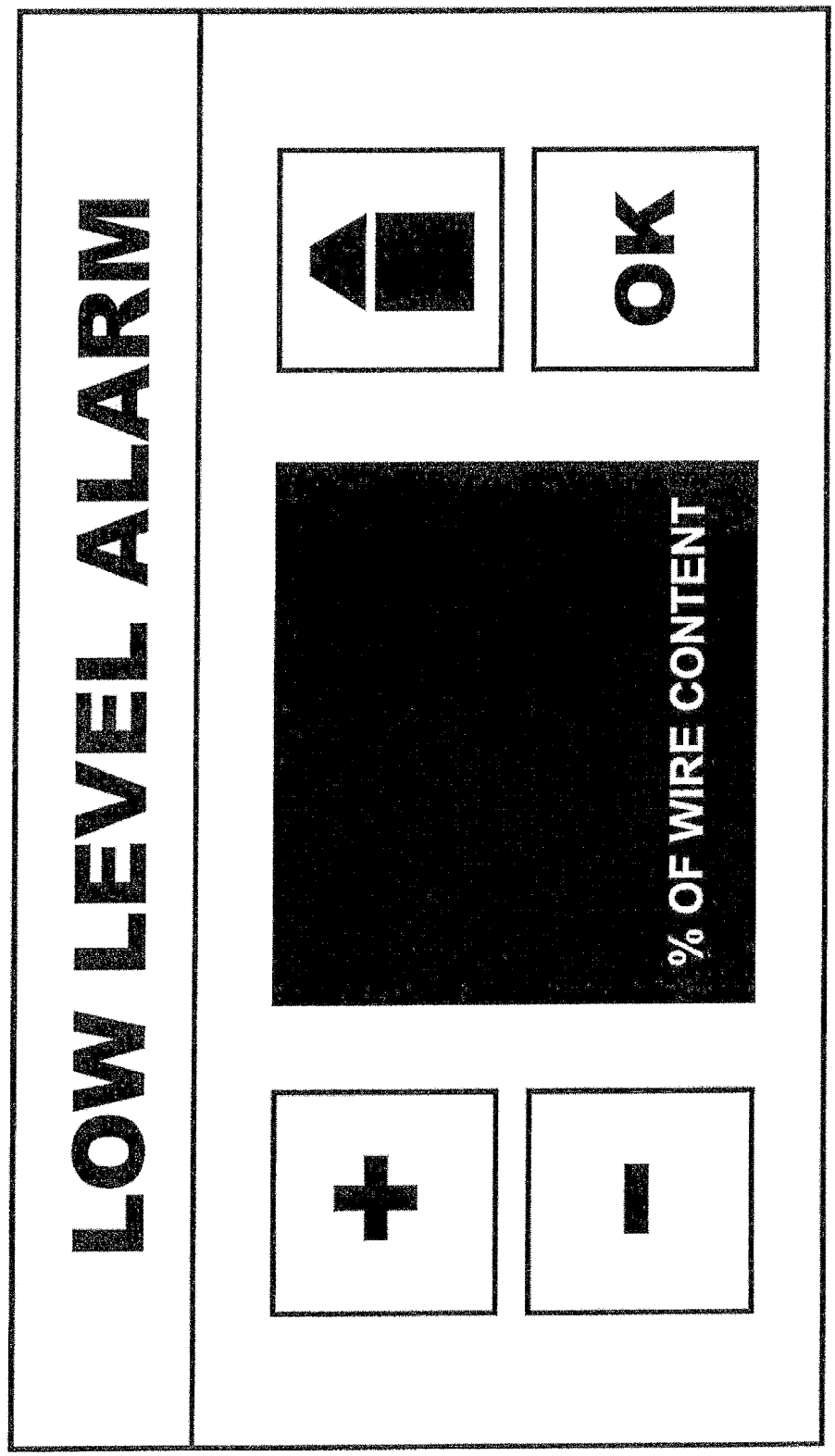

Another important parameter is the weight of the pack, meaning the weight of the wire contained in welding wire container 16. Providing the weight of the pack in combination with the diameter and the type of the wire allows control 30 to calculate the length of welding wire contained in the particular pack. This also allows control 30 to inform an operator if the welding wire contained in welding wire pack 16 is most completely consumed. To this end, the settings allow an operator to indicate at what remaining percentage of the original amount of welding wire a low level alarm shall be provided. An operator can for example decide that he shall be warned if there is only 5% of welding wire left (please see FIG. 10).

Figure 11:
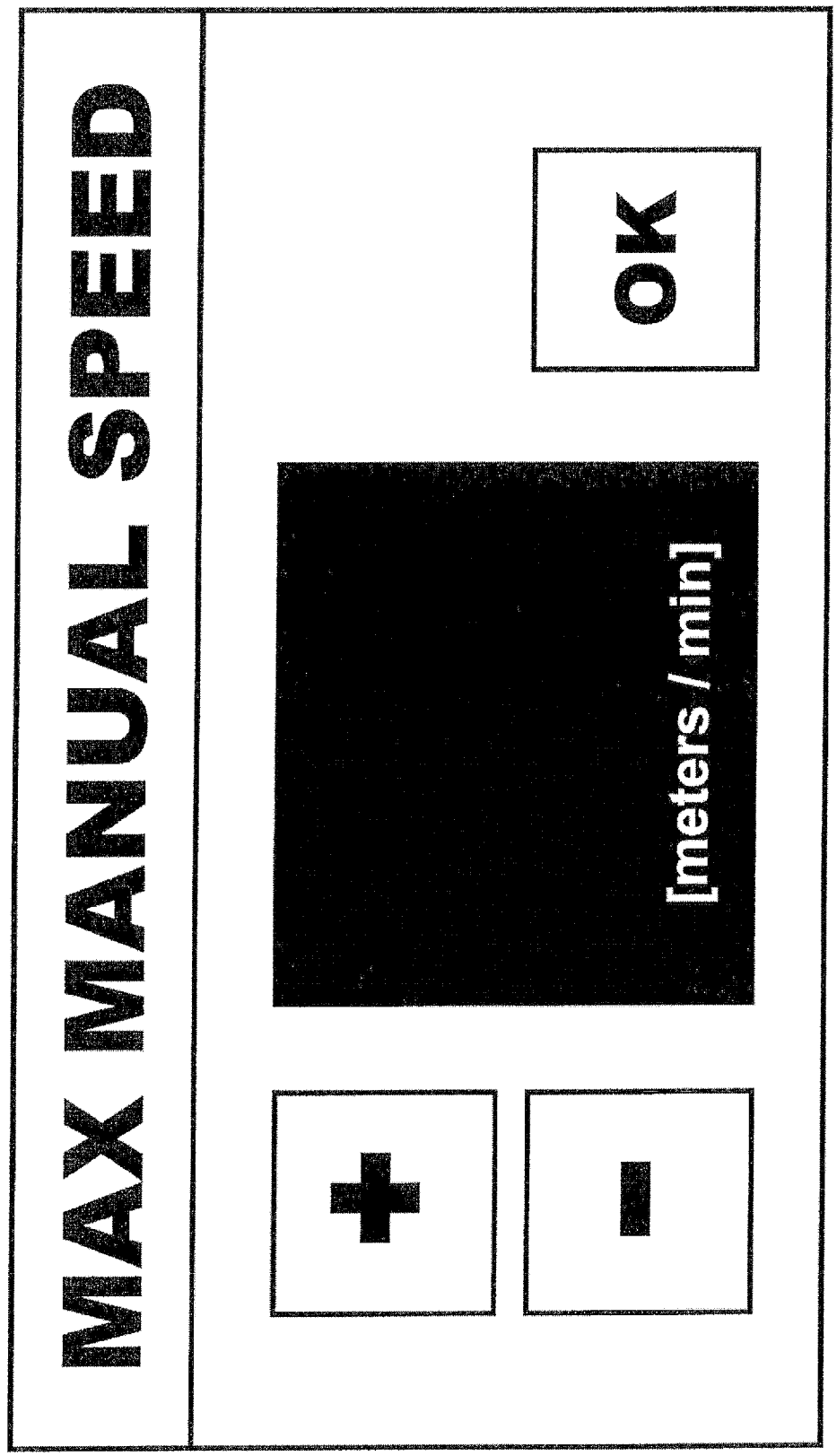
Figure 12:
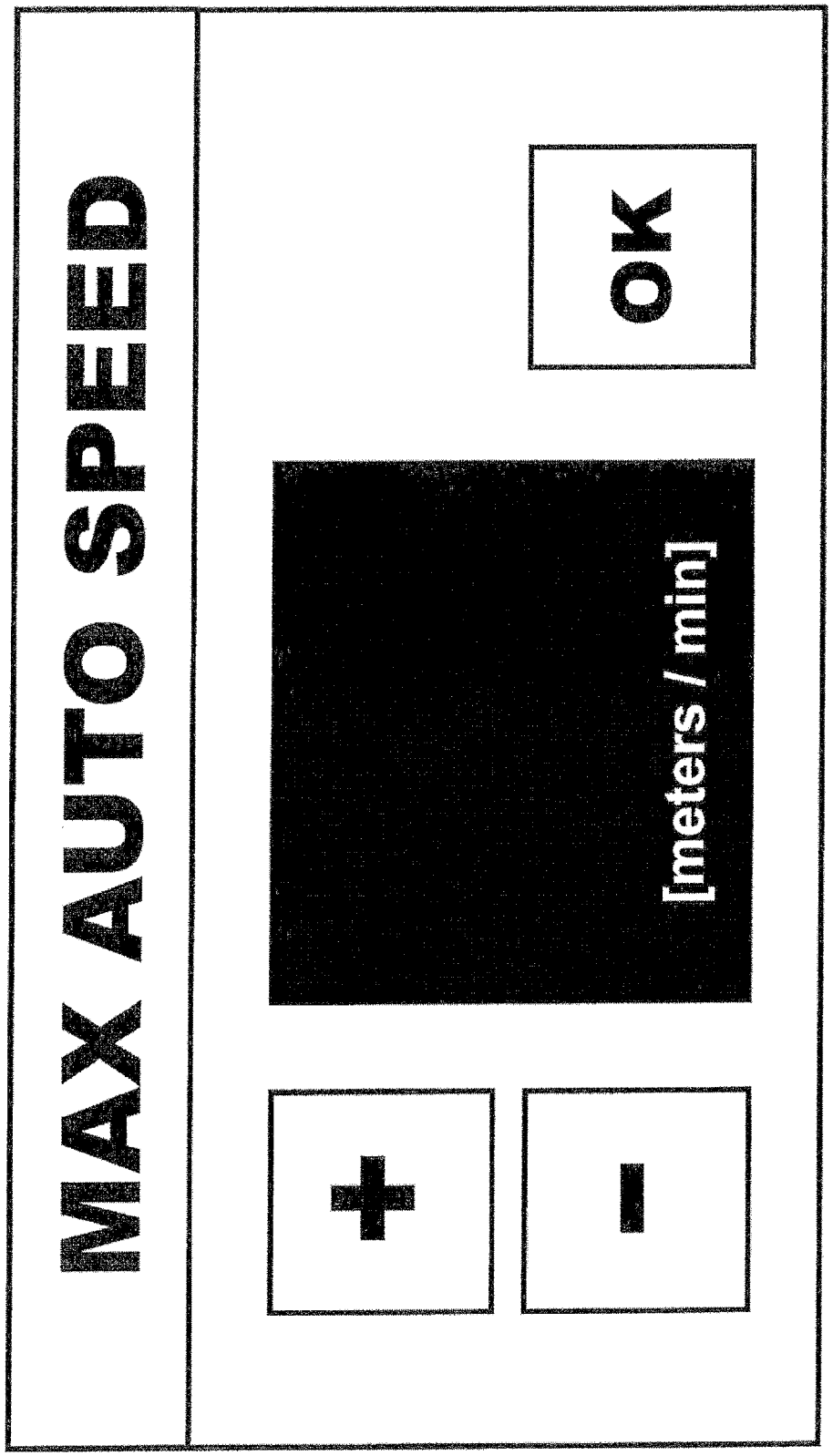
Figure 13:
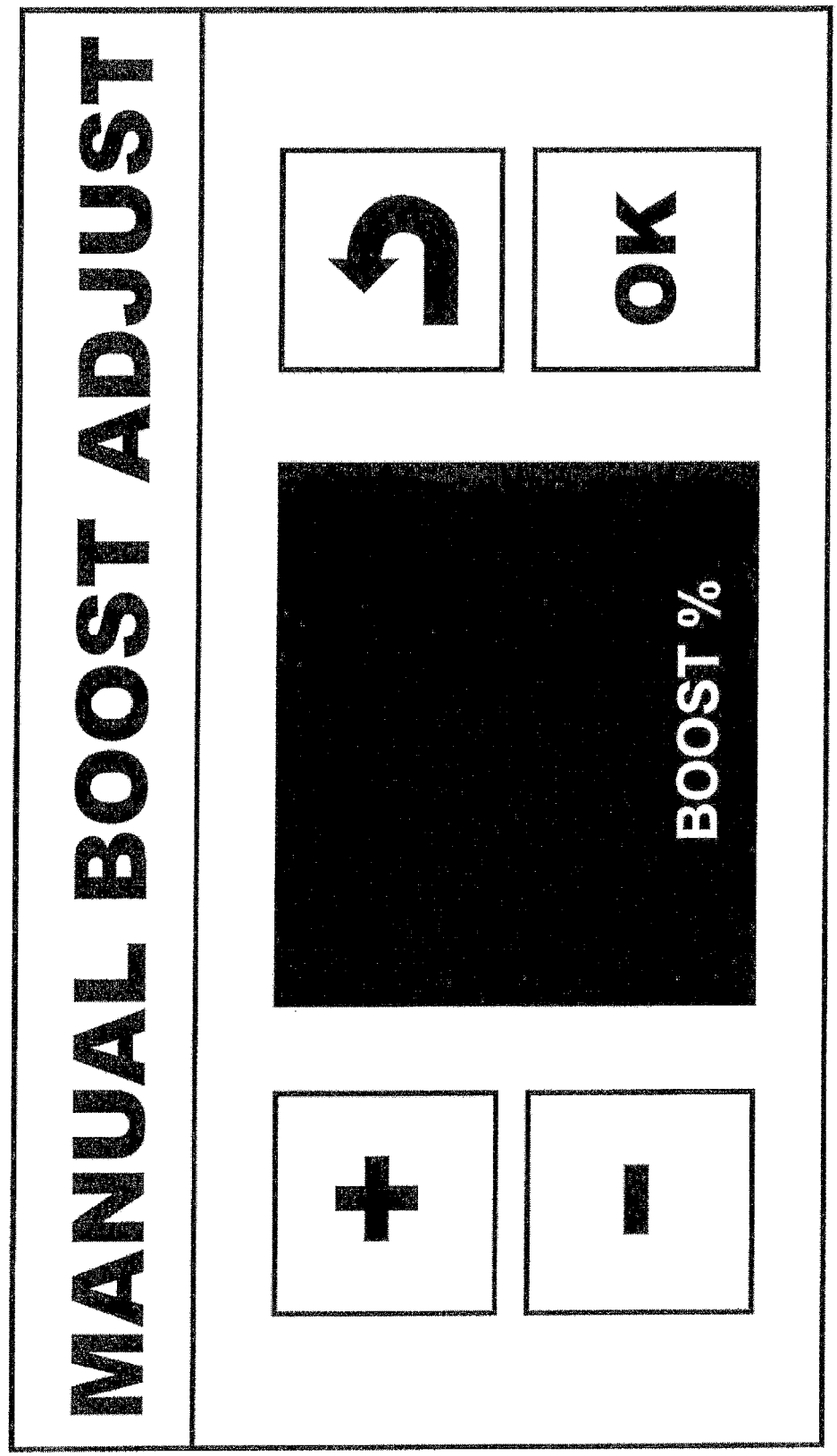

An operator can also define a maximum manual speed (please see FIG. 11) or a maximum auto speed (please see FIG. 12) which shall be provided by welding wire feeder 22. Still further, an operator can manually adjust the boost (meaning, the drive force which welding wire feeder 22 provides in addition to the action of main wire feeder 14) if the feed assistance calculated by control 30 does not meet the expectation of the operator. As an example, an operator can indicate what percentage of the maximum driving power of the motor shall be provided (please see FIG. 13).

Figure 14:
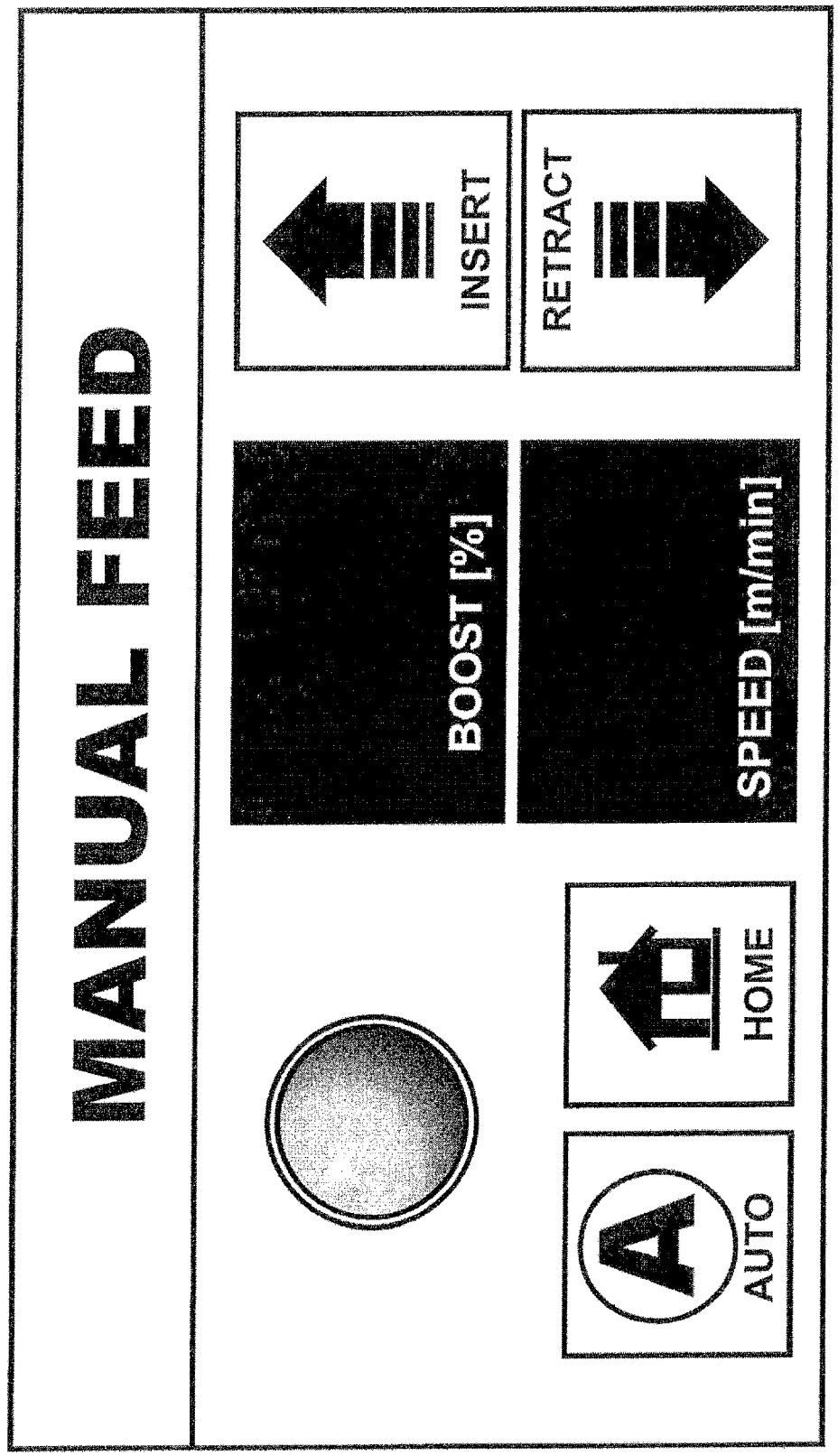

In the manual feed mode (please see FIG. 14), operator interface 32 shows a screen in which the operator can manually operate welding wire feeder 22 by telling the feeder in which way to feed the welding wire, with which boost and with which speed.

Figure 15:
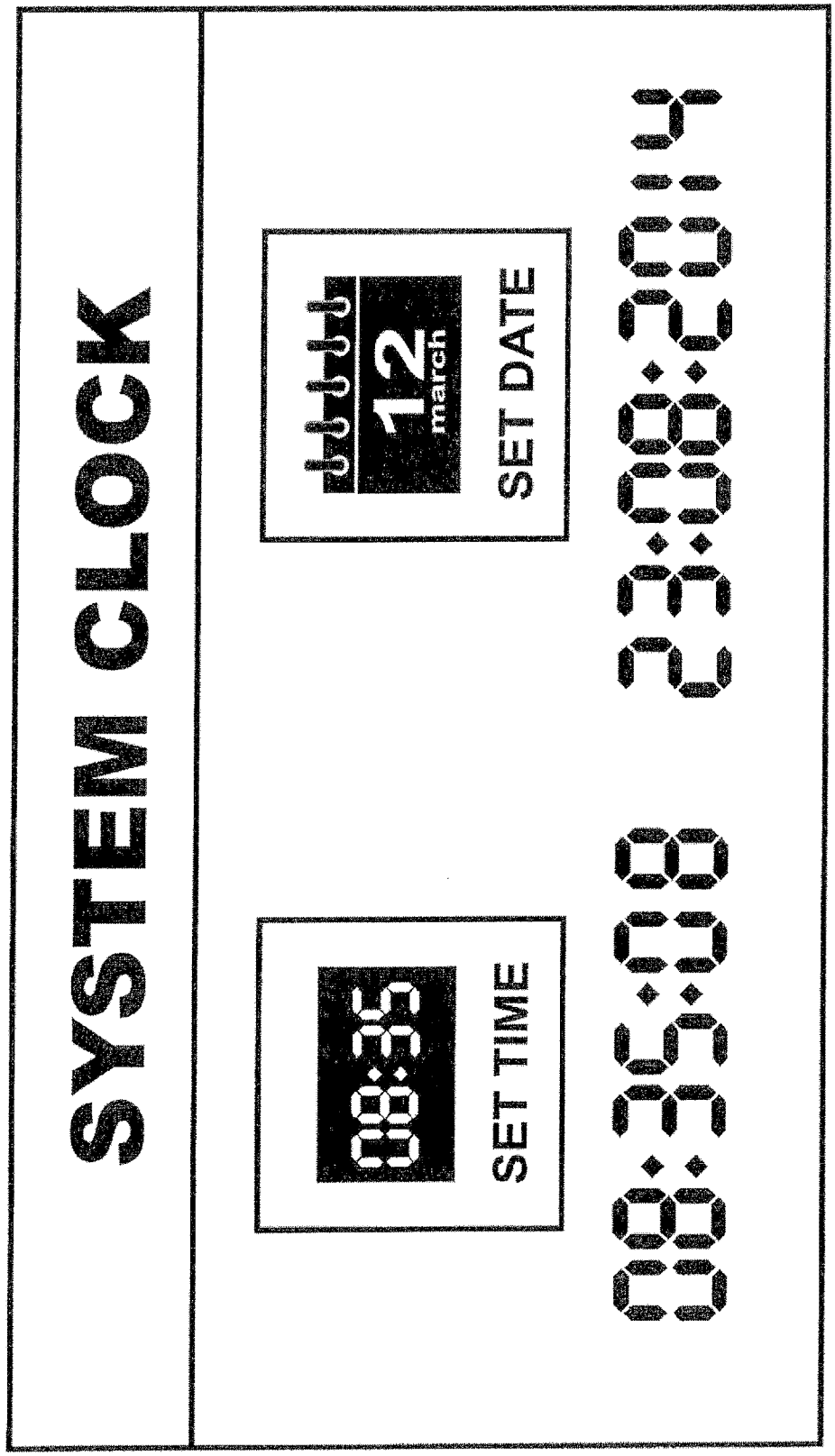

The screen shown in FIG. 15 allows an operator to make basic settings such as time and date.

Figure 16:
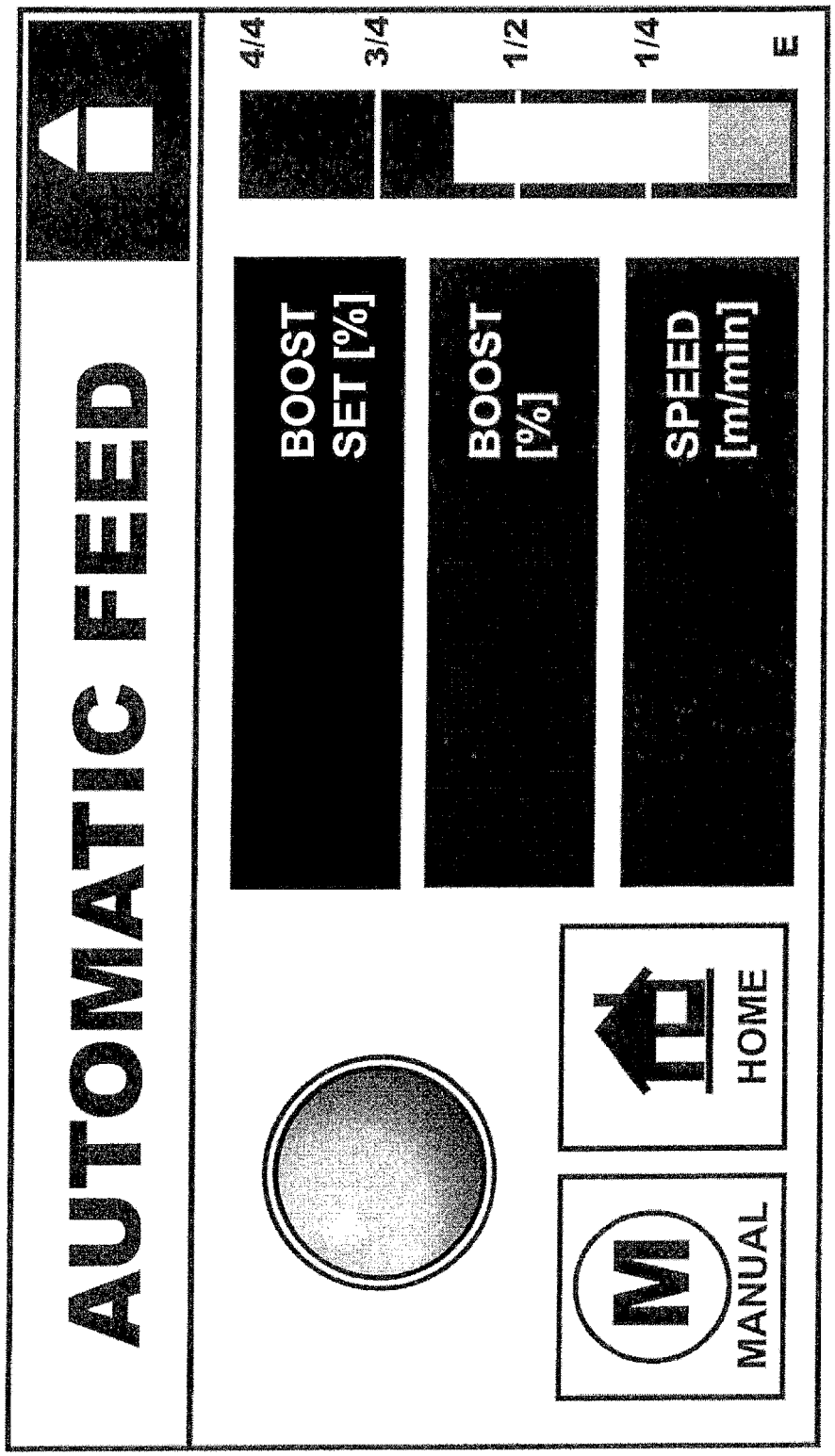

FIG. 16 shows a screen which is shown by operator interface 32 during an automatic mode of welding wire feeder 22. The screen here shows essential parameters such as the boosts set and the actual boost, the feeding speed, the currently available amount of welding wire (in this example approximately ⅝ of the original amount) and the level at which a low wire alarm will be triggered (here approximately ⅛ of the original amount).

Figure 17:
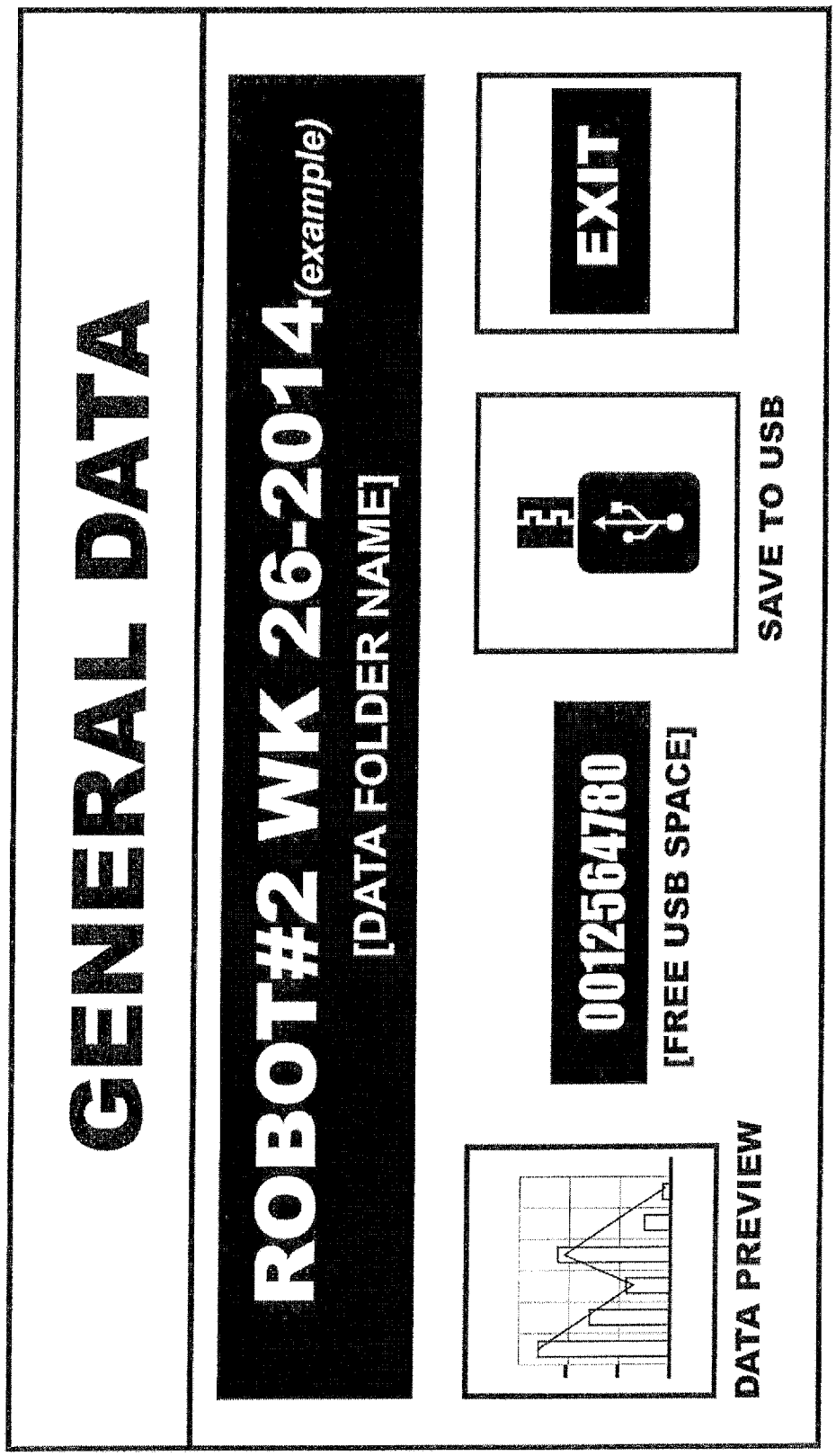

Welding wire feeder 22 can also be used for collecting and making available to an operator certain data associated with the welding process. An example is shown in the screens of FIGS. 17 and 18 where general data relating to a certain welding robot and collected over a certain time of operation is made available to an operator. This allows analyzing the performance of the particular welding robot and, if a plurality of welding robots is being used in parallel, to compare their operation.

Figure 19:

It is also possible to analyze individual welding processes or a welding process of certain parts. An example is shown in FIGS. 19 and 20 which show slides providing information on specific parts welded by welding robot 10 to which welding wire is fed by welding wire feeder 22. Welding wire feeder 22 calculates or counts the amount of welding wire advanced towards welding torch 10 based on the number of rotations of feeding wheel 26. To this end, control 30 takes from a lookup table the true feeding wheel circumference which varies depending from the diameter of welding wire 18.

Feeding wheel 26 as a groove (usually a V-groove) which ensures that the welding wire is properly guided at the feeding wheel. The smaller the wire diameter, the deeper the wire sits within the groove thereby reducing the actual length by which the welding wire is advanced per rotation of feeding wheel 26.

Furthermore, control 30 is provided with information as to how many meters of welding wire correspond to the amount of for example one kilogram, based on the diameter of the welding wire and the material. Based on the values provided by the operator, control 30 very precisely knows how much welding wire is available within the respective welding wire container 16.

Figure 21:
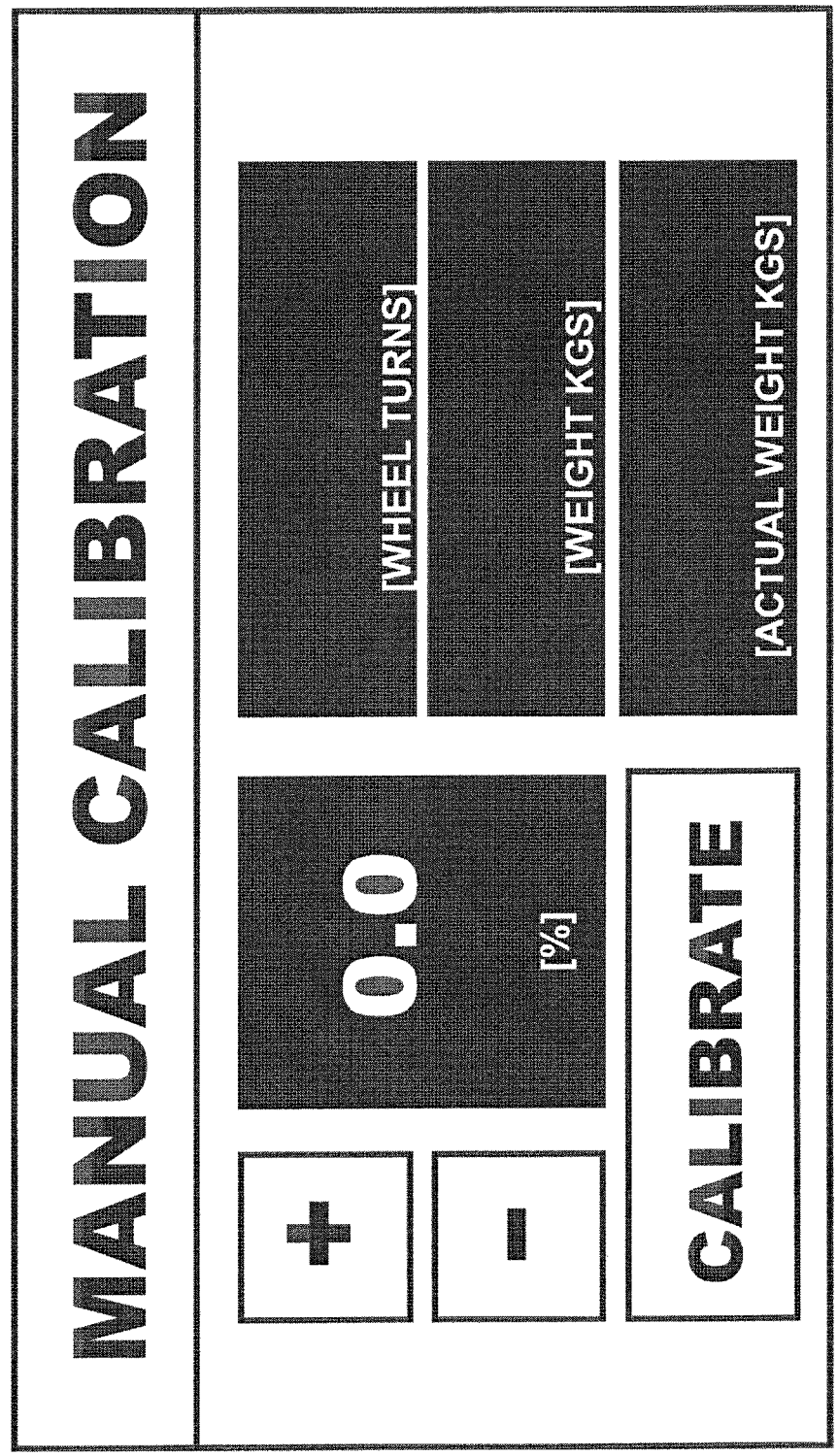

It is furthermore possible to calibrate the welding wire feeder to the actual diameter of the welding wire in use. FIG. 21 shows a screen with which the date in the look-up table in control 30 can be modified if an operator, after a certain period of time, makes a determination as to the actual diameter of the welding wire contained in the currently used container. Such deviation can be made with a precision scale and the information as to how many meters of welding wire have been withdrawn. The length of the consumed welding wire allows calculating how many kilograms should have been withdrawn. Any difference to the actual loss of weight of the pack must be due to the welding wire having a diameter which differs from the nominal value.

The operator can input this delta so as to increase the accuracy of the data provided by the welding wire feeder for the rest of the welding wire pack.

If the welding wire feeder is being reset for a fresh pack, the inputted diameter correction is reset as the deviation in diameter usually differs from pack to pack.

In addition to the screen explained so far, a screen saver can be provided.

It is now explained how the welding wire feeder is being used.

At the beginning of a welding operation when a fresh pack 16 is provided, the operator resets the counter within welding wire feeder 22. Based on the length of welding wire advanced towards torch 10, control 30 can therefore continuously show to an operator interface 32 how much welding wire remains in the container, and can also indicate (for example by changing the wire level indication from green to red) that an amount of welding wire remains which is below a certain level.

Setting the level at which a low level alarm is triggered, to a desired level allows adapting welding wire feeder 22 to the particular circumstances where it is being used. If welding wire feeder 22 is used in a large plant where there are hundreds of robots, it is impossible to place a backup wire container on every station. In order to prevent that a pack runs empty while there is no forklift available for promptly delivering a new pack, the low level warning can be set to a level which is high enough for an operator to order a forklift to bring a new pack within for example the next eight hours or even the next day, depending on how the alarm is set.

When a new pack is loaded, it is sufficient to click on a symbol for a new pack on operator interface 32 so as to reset the current counting and to restart.

Based on the feeding information gathered in control 30, valuable additional information can be provided to an operator. This information can comprise the actual production time of the welding robot, the actual time during which the robot is in stand-by but not welding, the total length of welding wire used in a specific welding robot, the length of welding wire used for producing a specific component, the downtime of the welding robot, the time it took to weld a certain part, how many welds were necessary in a particular sequence, how much wire has in fact been deposited, etc.

This information allows a very convenient calculation of the costs of welding a particular part or a number of parts. By indicating the working hours and comparing them with the actual run time of the welding wire feeder, robot efficiency and productivity can be very easily determined. This can be checked on a weekly, monthly or yearly basis and can be compared with other robots in the same plant.

It can also be checked how long the welding robot was down during a specific period of time, for example to double-check with the number of hours which were charged by a repair team doing some maintenance on the robot.

In case the performance of two competitive welding wires is to be compared, the data supplied by the welding wire feeder regarding robot productivity will provide a reliable hint as to which welding wire performs best.

Furthermore, the productivity level can allow a plant manager to concentrate on the robots with the worst performance and analyze the reasons for the bad performance (defective parts, bad maintenance, etc.).

Welding wire feeder 22 can also help analyzing operating costs, in particular for energy, in case of comparison with a welding wire feeder of a different type (for example electrically driven as compared to pneumatically driven).

Figure 22:
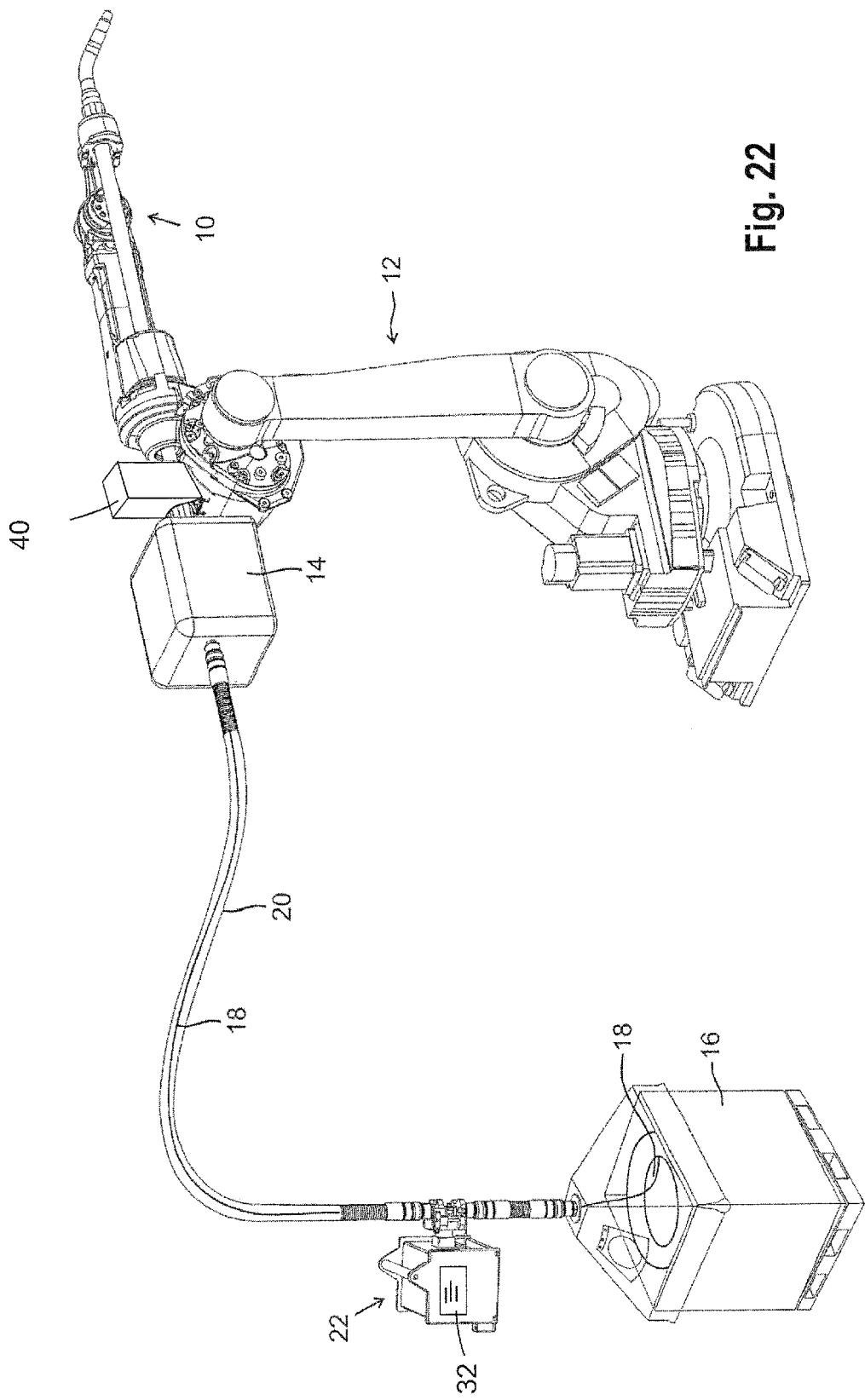
FIG. 22 shows a different embodiment of an installation for automated welding.

In the embodiment described so far, feeding wheel 26 can be considered as part of a sensor for detecting welding wire feed motion. It is however also possible to use a separate module for detecting and counting the feed motion of welding wire 18. Such embodiment is shown in FIG. 22 in which a module 40 for controlling welding parameters is being used adjacent to welding torch 40, with module 40 being formed separate from welding wire feeder 22.

Module 40 (please see FIGS. 23 and 24) comprises a sensor for detecting welding wire feed motion and is here in the form of an encoder 42. Encoder 42 is connected to a wheel 44 which is passively driven by the welding wire which is guided through module 40. In order to ensure that there is no slip between the welding wire and wheel 44, a pressing wheel 46 is provided which maintains a sufficient frictional contact between the welding wire and wheel 44.

The number of revolutions of wheel 44 as counted by encoder 42 is sent to control 30 of welding wire feeder 22 via a data connection. The data connection can be an electric cable which can be integrated into guiding liner 20 and can for example use the USB standard, or can be a wireless transmission using an Ethernet protocol, Bluetooth, Wi-Fi (WLAN) or a similar standard. All functions provided by welding wire feeder 22 based on the information provided by module 40 are the same as described above for the first embodiment.

The measuring accuracy of the second embodiment is slightly higher than for the first embodiment as there is no slip between the welding wire and the wheel which "counts" the feeding process. In the first embodiment, it cannot always be prevented that there is some slip between the feeding wheel and the welding wire.

As an alternative to a mechanical sensing as is done in module 40 shown in

Figure 23:
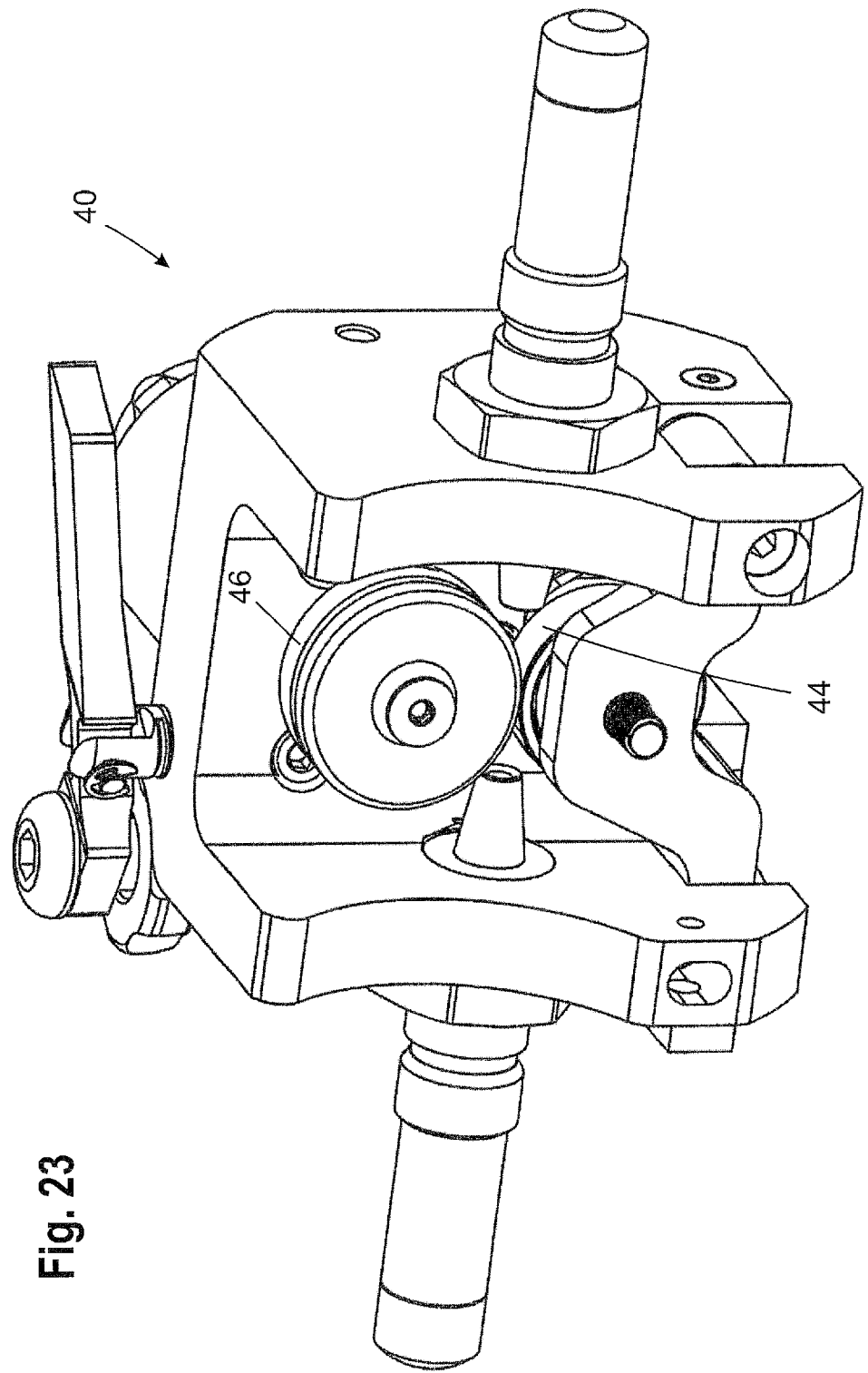
FIG. 23 shows in a perspective view a module for acquiring the welding wire speed as used in the installation of FIG. 22.
Figure 24:
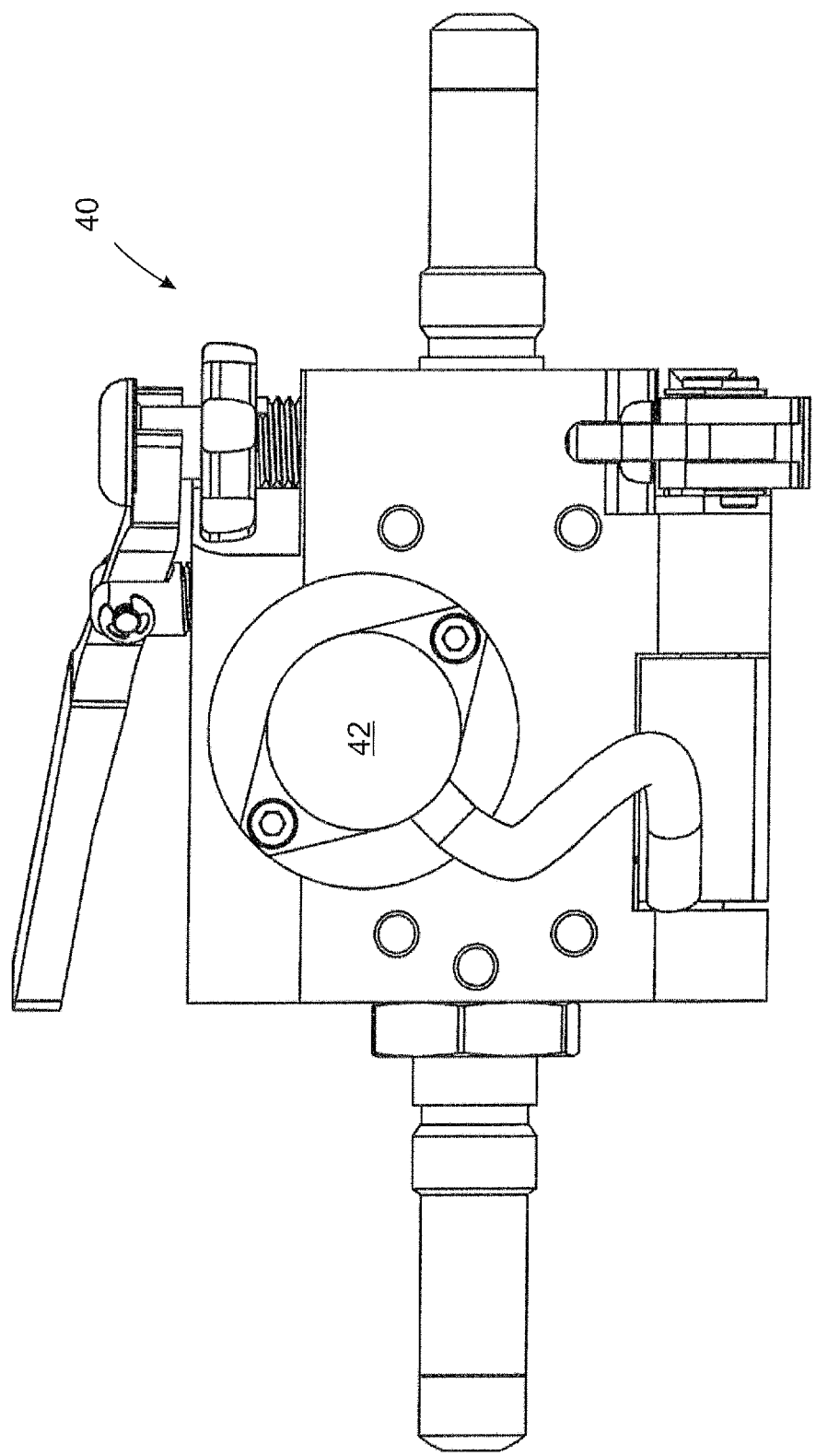
FIG. 24 shows a rear view of the module of FIG. 23.

FIGS. 22 to 24, module 40 could employ a contact-free sensor which uses for example acoustic waves or electromagnetic waves for sensing the welding wire feed motion. Such sensor could also be incorporated into welding wire feeder 22.

The invention claimed is:

1. A welding wire installation comprising a welding robot with a welding torch, a wire container, a motor driven main wire feeder associated with the welding robot, and a motor driven stand alone auxiliary booster wire feeder which operates completely separately and independently from the main wire feeder and assists an advancing movement of the wire by the main wire feeder through a wire guide, wherein the stand alone auxiliary booster wire feeder is located on the wire guide between the wire container and the main wire feeder, the stand alone auxiliary wire feeder comprising a module for acquisition, elaboration and recording of welding data, having a sensor associated with the auxiliary wire feeder for detecting welding wire feed motion, a processor for storing data provided by said sensor, and an output device for providing said data.

2. The installation of claim 1 wherein said sensor comprises a wheel that is adapted for contacting welding wire.

3. The installation of claim 2 wherein an encoder is provided which senses rotation of said wheel.

4. The installation of claim 1 wherein said sensor is a contact-free sensor.

5. The installation claim 1 wherein said sensor uses one of acoustic waves and electromagnetic waves for sensing a welding wire feed motion.

6. The installation of claim 1 wherein a touch display is provided for allowing an operator to input parameters.

7. The installation of claim 6 wherein a wire level monitoring module is provided which is adapted for continuously informing an operator of the actual amount of welding wire in the wire container.

8. The installation of claim 6 wherein a wire level monitoring module is provided which is adapted for warning an operator if the amount of welding wire falls beneath a predefined value.

9. The installation of claim 1 wherein said module being connected to said main wire feeder by a data connection which is coupled to said output device.

10. The installation of claim 9 wherein said data connection is an electric cable.

11. The installation of claim 9 wherein said data connection comprises a wireless transmission device.

12. The installation of claim 1 wherein the main wire feeder comprises a motor, a feeding wheel driven by said motor and adapted for advancing welding wire, a control adapted to control operation of said motor, an operator interface adapted for allowing an operator to input data which are being used by said control, and for making available to an operator data related to a welding process in which the welding wire provided by said welding wire feeder is being used.

13. The installation of claim 12 wherein said operator interface is a touch display.

14. The installation of claim 12 wherein said feeding wheel is mounted with a quick connection coupling to allow removal and replacement of the feeding wheel for a different type of wire.

15. The installation of claim 12 wherein an electrical data interface is provided via which data collected by said welding wire feeder is transferred to an external device.

16. A method for operating the installation of claim 1 wherein the main wire feeder has a motor, a feeding wheel driven by said motor, a control which controls operation of said motor, an operator interface adapted for allowing an operator to input data which is being used by said control, said method comprising the steps of counting a length of welding wire supplied from a currently used welding wire container, and of providing to an operator an indication of one of the welding wire remaining in said currently used welding wire container and the welding wire already withdrawn from said currently used welding wire container.

17. The method of claim 16 wherein said control guides an operator through a sequence of steps with which parameters for counting the length of said welding wire are collected.

18. The method of claim 16 wherein said control makes available to an operator at least one of the parameters selected from: effective run time of said welding wire feeder, actual welding time counted from a start signal, number a separate welds counted from a start signal, and an amount of welding wire being supplied.

19. The method of claim 16 wherein said main wire feeder is calibrated and adjusted based on an actual diameter of said welding wire in use.

20. A welding wire installation comprising a welding robot with a welding torch, a wire container, a motor driven main wire feeder associated with the welding robot, and a motor driven stand alone auxiliary wire feeder which operates completely separately and independently from the main wire feeder and assists an advancing movement of the wire by the main wire feeder through a wire guide, wherein the stand alone auxiliary wire feeder is located on the wire guide between the wire container and the main wire feeder, the stand alone auxiliary wire feeder comprising a module for acquisition, elaboration and recording of welding data, having a sensor associated with the auxiliary wire feeder for detecting welding wire feed motion, a processor for storing data provided by said sensor, an output device for providing said data, and an operator interface adapted for allowing an operator to input control data, and for making available to an operator data concerning wire usage.

* * * * *